(12) United States Patent
De Leo et al.

(10) Patent No.: US 6,576,857 B1
(45) Date of Patent: Jun. 10, 2003

(54) METHOD OF OPTIMIZING A MAIL SORTING PROCESS

(75) Inventors: Guido De Leo, Genoa (IT); Massimo Mortola, Genoa (IT)

(73) Assignee: Elsag SpA, Genoa (IT)

( * ) Notice: Subject to any disclaimer, the term of this patent is extended or adjusted under 35 U.S.C. 154(b) by 0 days.

(21) Appl. No.: 09/680,748

(22) Filed: Oct. 6, 2000

(30) Foreign Application Priority Data

Oct. 7, 1999 (IT) .......................................... TO99A0865

(51) Int. Cl.[7] .................................................. B07C 3/00
(52) U.S. Cl. ........................................ 209/584; 209/900
(58) Field of Search ................................ 209/583, 584, 209/900

(56) References Cited

U.S. PATENT DOCUMENTS

| | | | | |
|---|---|---|---|---|
| 5,287,271 A | * | 2/1994 | Rosenbaum | 364/409 |
| 5,421,464 A | * | 6/1995 | Gillmann et al. | 209/584 |
| 5,901,855 A | * | 5/1999 | Uno et al. | 209/584 |
| 5,924,576 A | * | 7/1999 | Steenge | 209/584 |
| 6,107,588 A | * | 8/2000 | De Leo et al. | 209/584 |

FOREIGN PATENT DOCUMENTS

| | | |
|---|---|---|
| EP | 0 684 086 A2 | 11/1995 |
| EP | 0 916 412 A2 | 5/1999 |
| EP | 0 947 962 A2 | 10/1999 |
| GB | 2 335 639 A | 9/1999 |
| IT | 947 962 A2 * | 10/1999 |

OTHER PUBLICATIONS

Derwent Abstract #2000–184799 (Inventor: De Leo, Guido; Abstracted Pub: EP 980720 A2).*

* cited by examiner

*Primary Examiner*—Donald P. Walsh
*Assistant Examiner*—Joseph C Rodriguez

(57) ABSTRACT

There is described a method of optimizing a mail sorting process having a first and at least a second sorting cycle performed in succession on a sorting machine, which receives a group of mail items at an input and supplies, at its outputs, the mail items identified and separated according to given sorting rules; in a given sorting cycle, the mail items being fed to the outputs of the machine according to a predetermined respective sorting criterion, and then being fed in orderly manner back into the input of the machine for a following sorting cycle; each output of the sorting machine being assigned at least one respective delivery location according to an assignment criterion related to the delivery order of the mail items in the delivery locations. The optimization method includes the steps of: assigning to a first group of delivery locations a first sorting identifier indicating to which sorting cycles the mail items in the first group of delivery locations are to be subjected, and to a second group of delivery locations a second sorting identifier indicating to which sorting cycles the mail items in the second group of delivery locations are to be subjected, the first and second sorting identifiers being different from each other; and subjecting each of the mail items to the sorting cycles indicated by the respective sorting identifiers.

24 Claims, 16 Drawing Sheets

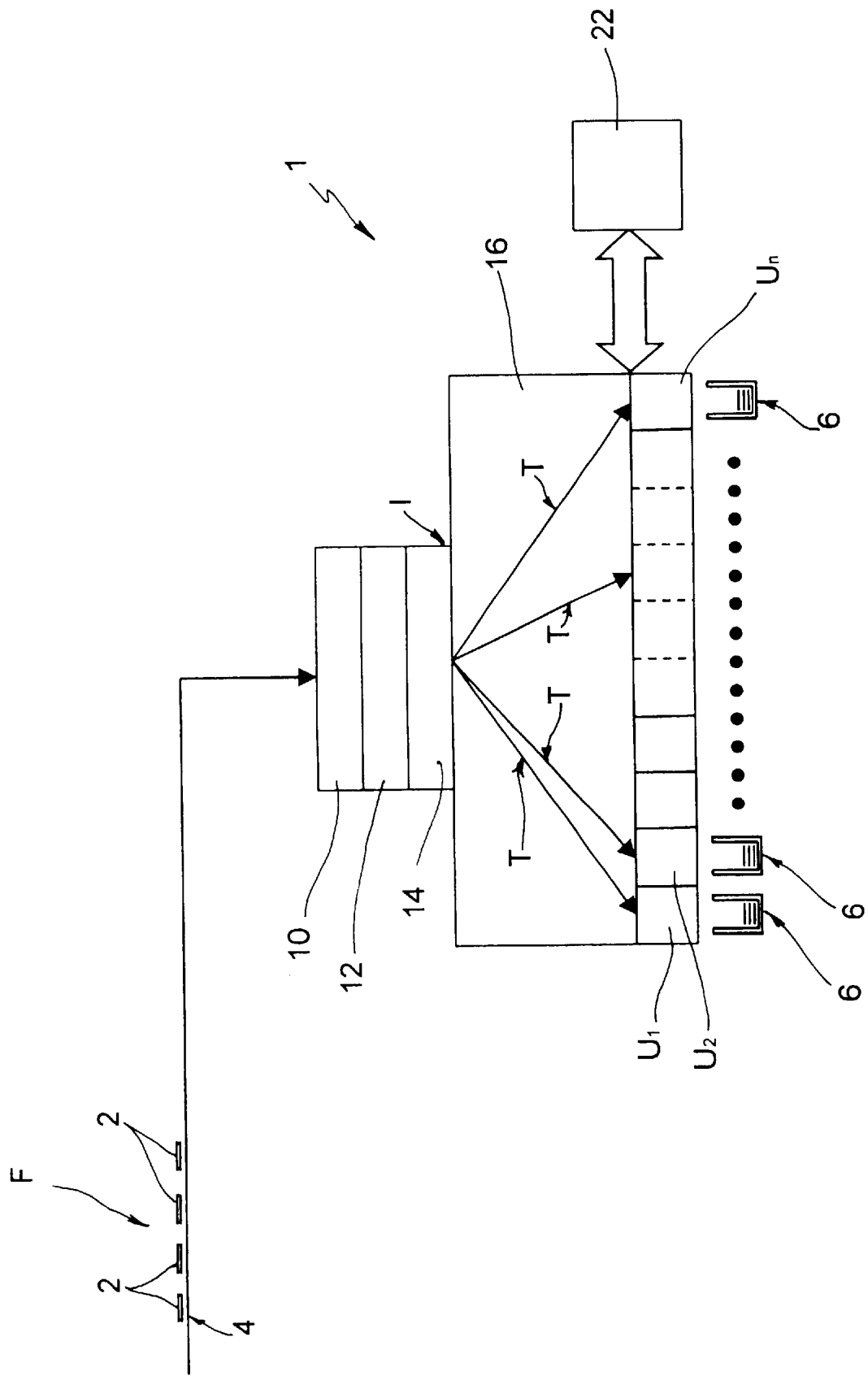

METHOD OF OPTIMIZING A MAIL SORTING PROCESS

The present invention relates to a method of optimizing a mail sorting process.

BACKGROUND OF THE INVENTION

Mail sorting machines are known which receive a randomly arranged stream of mail items at the input, and supply a sequenced stream of mail items at the output, i.e. a stream of mail items arranged in a predetermined order enabling sequential delivery by one or more postmen, each assigned a particular route.

More specifically, known sorting machines normally comprise an input receiving a mail batch, i.e. a group of mail items for sorting; a number of outputs, which may have respective containers for respective groups of mail items; and a sorting device interposed between the sorting machine input and outputs, and controlled by an electronic processing unit for directing each mail item to a respective output on the basis of a code, normally impressed on the mail item, and a table correlating the code to a given machine output.

The order in which the mail items in each batch are fed to the machine outputs may be defined, for example, by a sequence of adjacent delivery locations or destinations corresponding to address numbers, or groups of address numbers, of buildings along the delivery route of the mail items in that particular batch.

Each operative delivering the mail items in the batch is assigned a distinct group of machine outputs from which the assigned mail items are removed at the end of the sorting process.

A generic sorting process performed by the machine on a given mail batch normally comprises a number of sorting cycles by which groups of mail items are fed repeatedly and in orderly manner back into the machine input, and directed to outputs from whose containers the mail items deposited in the previous cycle have been removed.

More specifically, in the first cycle in the sorting process, the mail items are fed into the machine input and sorted into the outputs according to a first given criterion. The mail items are then removed in orderly manner from the outputs and fed back into the machine input in a predetermined order to perform a second sorting cycle, and so on up to the last sorting cycle, in which the mail items are sorted into the outputs according to an nth given criterion, and are then removed from the outputs, e.g. for actual delivery.

At the end of the sorting cycles, the groups of mail items coming off the sorting machine are arranged in a predetermined order enabling sequential delivery by an operative assigned a subsection of a predetermined route.

The maximum number of delivery locations the sorting machine can handle in a given sorting process depends on the number of machine outputs available for the sorting process and the number of cycles in the sorting process, and, in particular, equals a value $NU^{NC}$, where NU is the total number of machine outputs available for the sorting process, and NC the number of cycles in the sorting process.

In certain operating conditions, the relationship between the maximum number of delivery locations that can be handled by the machine in a given sorting process, the number of machine outputs available for the sorting process, and the number of cycles in the sorting process, may result in inefficient utilization of the sorting machine.

More specifically, situations may arise in which the number of delivery locations to be addressed is slightly higher than the maximum number actually addressable in the sorting process employing a given number of sorting cycles, and is well below the maximum number addressable in the sorting process employing the next higher number of sorting cycles.

Situations of this sort can be handled by either increasing the number of sorting cycles, increasing the number of sorting machine outputs, or dividing the mail batch into two or more sub-batches for processing separately.

All three solutions, however, are unfeasible for various reasons.

In particular, increasing the number of sorting cycles results in poor utilization of the machine, as well as increased processing time and cost; increasing the number of machine outputs makes for higher production cost of the machine, requires more floor space, and is difficult to implement and decidedly expensive in the case of machines already built and installed; while dividing the mail batch into two or more sub-batches may not be compatible with end user requirements, and anyway calls for redefining pre-sorting routines to generate the sub-batches, and also results in increased processing time and cost.

Situations may also arise in which the number of delivery locations to be addressed is comparable with the maximum number actually addressable in the sorting process employing a given number of sorting cycles, but certain delivery locations have such a high mail traffic as to fill the respective machine outputs on their own.

Situations of this sort invariably result in inefficient processing, on account of the fact that, by filling a respective machine output on their own, the mail items of such delivery locations, after the first sorting cycle, are substantially only moved from one output to another without undergoing any real sorting process.

SUMMARY OF THE INVENTION

It is an object of the present invention to provide a method of optimizing a mail sorting process in particular sorting machine operating situations of the type described above.

According to the present invention, there is provided a method of optimizing a mail sorting process, as claimed in claim 1.

BRIEF DESCRIPTION OF THE DRAWINGS

A preferred, non-limiting embodiment of the present invention will be described by way of example with reference to the accompanying drawings, in which:

FIG. 1 shows a schematic view of a mail sorting machine;

DETAILED DESCRIPTION OF THE INVENTION

Figure 2A:
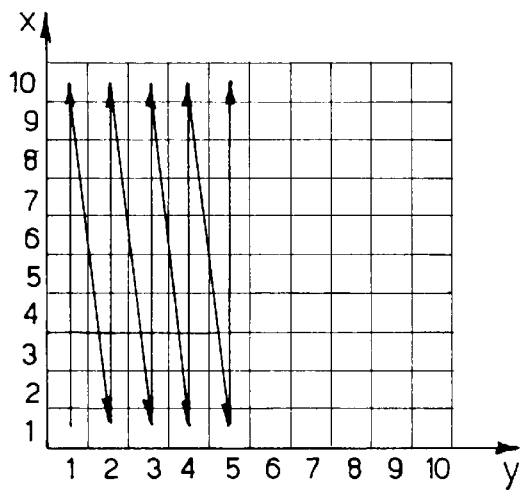
FIGS. 2a–2g show matrix representations of a sorting process comprising two sorting cycles and optimized in accordance with the present invention.

Number 1 in FIG. 1 indicates as a whole a sorting machine comprising an input I for receiving a stream F of mail items 2 (e.g. letters, postcards, enveloped documents, or flat, substantially rectangular items in general) arranged sequentially (e.g. in stacks) and fed to input I on a known (e.g. belt) conveying device 4; and a number (N) of separate outputs U1, U2, U3, . . . , UN, each of which may conveniently be provided with a pull-out container 6 (shown schematically) into and from which mail items 2 are stacked and removed.

Stream F of mail items 2 comprises a number of mail items 2, each impressed beforehand with a code, e.g. a bar code, indicating the delivery location or destination of mail item 2, and which are arranged in a random sequence, i.e. with no order and no relationship between the arrangement of mail items 2 and the order in which they are eventually delivered.

Input I of sorting machine 1 is provided with a separating device 10 (shown schematically), which receives mail items 2 from conveying device 4, withdraws mail items 2 from stream F, and spaces each mail item 2 apart from the other mail items 2 in stream F; a reading device 12 (shown schematically), which receives mail items 2 from separating device 10 and reads the code on each mail item 2; a delay module 14 (shown schematically), which receives mail items 2 from reading device 12; and a sorting device 16 housed inside sorting machine 1 and interposed between the output of delay module 14 and outputs U1, U2, U3, . . . , UN.

Sorting machine 1 is controlled by a programmable electronic unit 22, under the control of which, sorting device 16 directs the incoming stream F at input I into all N outputs of sorting machine 1, i.e. operates in common sorting mode whereby each incoming mail item 2 at input I may potentially be fed into any one of the N number of outputs.

Mail item feed through sorting device 16, i.e. the path T traveled by a mail item 2 through sorting device 16 from input I into a given output Ui, depends on the code impressed on mail item 2 and read by reading device 12.

For which reason, electronic unit 22 comprises an electronic table, which is supplied, e.g. by reading device 12, with data relative to the code impressed on each mail item 2, and in turn supplies a set of output data indicating the output Ui to which mail item 2 is to be directed.

The output data is transmitted to sorting machine 1 to generate control signals governing actuating members, e.g. blade selectors, transmission members, etc. (not shown), which combine to form through sorting device 16 the path T along which to feed mail item 2 to the selected output Ui.

Utilization of the sorting machine outputs at the end of the first and second cycle in the sorting process can be represented by a matrix of the type shown in FIG. 2a, in which each column indicates the operating status of a respective sorting machine output in the second sorting cycle, and each row indicates the operating status of a respective sorting machine output in the first sorting cycle.

The boxes in the FIG. 2a matrix assume precise meanings related to the delivery locations or destinations of the mail items; and, in particular, each matrix box defines, within the matrix, a respective virtual location, which may be assigned a real address of a delivery location to which the mail items are to be delivered.

Since each box in the matrix is identified uniquely by a respective pair of numbers indicating the box row and column, each virtual location to which a delivery location is assignable may therefore be represented by the pair of numbers identifying the row and column of the respective box.

Moreover, given the biunique relationship between the matrix rows and columns and the sorting machine outputs in the first and second sorting cycle, each pair of numbers indicating the column and row of a respective virtual location also represents the sorting machine output which the mail items of the delivery location assigned to that particular virtual location will occupy at the end of the first and second sorting cycle respectively.

The actual physical location of the sorting machine outputs does not necessarily correspond to the consecutive numeration of the matrix columns and rows, i.e. the sorting machine outputs are not necessarily arranged in ascending order corresponding to that of the column and row numbers.

That is, with regard to the columns, for example, the sorting machine output represented by column "1" need not be physically the first output on the sorting machine; and the output represented by column "2", which in the matrix is adjacent to and follows the first column, need not be physically the second output on sorting machine 1, or even be adjacent to or follow the output represented by column "1".

In other words, the consecutive numeration of the columns is a "logic" numeration, which corresponds to a "physical" arrangement of the sorting machine outputs on the basis of a predetermined relation memorized in electronic control unit 22 and employed in the sorting process to direct the mail items to the desired output.

The same also applies to the rows. In the following description, therefore, the term "logically adjacent outputs" is intended to mean sorting machine outputs related to columns or rows represented by successive identification numbers, even though the outputs themselves need not be physically adjacent, or their relative position deducible from the identification numbers of the respective columns or rows.

Moreover, the ascending consecutive logic numeration of the rows corresponds to the order in which the sorting machine outputs are cleared at the end of the first sorting cycle, i.e. the matrix row identified by number n corresponds to the nth sorting machine output cleared at the end of the first sorting cycle; and the ascending consecutive logic numeration of the columns corresponds to the order in which the mail items are subsequently processed, e.g. during actual delivery.

Given the relationship between the sorting machine outputs and the matrix columns in the second sorting cycle, and between the sorting machine outputs and the matrix rows in the first sorting cycle, the term "sorting machine outputs" and the terms "matrix columns" and "matrix rows" will be used indifferently in the following description, depending on which is clearer.

Also, in the following description, the matrix boxes assigned delivery locations will be referred to as "occupied", and those assigned no delivery locations as "vacant".

In the light of the above, the electronic table memorized in electronic unit 22, and which provides for determining the output to which a given mail item is to be directed on the basis of the data in the code impressed on the mail item, defines a biunique relationship between all the possible codes impressed on the mail items (to indicate, as stated, respective mail item delivery locations) and corresponding virtual matrix locations related to the coded delivery locations and each identified by a pair of numbers identifying the row and column of a respective matrix box.

The way in which the delivery locations are sorted into the sorting machine outputs at the end of the first and second sorting cycle can be deduced from the above matrix by assigning to a delivery location related to a given matrix box the sorting machine output corresponding to the box row number in the first sorting cycle, and the sorting machine output corresponding to the box column number in the second sorting cycle.

More specifically, in the course of each sorting cycle, once the code impressed on a given mail item is identified, the code-related virtual location and the two numbers identifying the row and column defining the virtual location are determined; and the virtual location is employed by the sorting machine to generate, via said table, control signals governing actuating members, e.g. blade selectors, transmission members, etc. (not shown), which combine to define through sorting device 16 a path T along which to feed the mail item into the selected output.

Since the mail items in each sorting machine output at the end of the second sorting cycle are arranged in a predetermined order enabling sequential delivery by an operative covering a given route, and since the delivery order is defined, for example, by a sequence of adjacent delivery locations corresponding to address numbers, or groups of address numbers, of buildings along the delivery route, the relation between all the possible codes impressed on the mail items and the corresponding virtual locations defined by said table must be such as to define a criterion by which the delivery locations are assigned to the respective sorting machine outputs in conformance with the above delivery order of the mail items.

More specifically, according to said relation, the delivery locations are assigned to the matrix boxes in ascending order, both as regards the columns—i.e. ascending along the x axis in FIG. 2a—and as regards the rows—i.e. ascending along the y axis in FIG. 2a. That is, the delivery locations are assigned, as shown in FIG. 2a, from the box in the bottom row of the first matrix column up to the box in the last row of the first column, and then from the box in the bottom row of the second column up to the box in the last row of the second column, and so on for all the other consecutive columns.

It should be pointed out that the order in which the delivery locations are assigned to the matrix boxes defines a delivery location to box assignment "direction" allowing of no change in position of the box numbers in the same column, which would, in fact, disrupt the sequential delivery order of the mail items along the delivery route.

The assignment order, however, only imposes an assignment "direction", and not that the delivery locations also be assigned to adjacent boxes. While still conforming with the assignment order, in fact, two boxes assigned delivery locations that are consecutive in the assignment order may possibly be separated by one or more boxes to which no delivery locations have been assigned.

Each box in the FIG. 2a matrix may also be assigned a number indicating, in absolute or exact terms or in terms of predicted traffic, the amount of mail expected for delivery to the box-related delivery location.

The sum of the numbers assigned to the boxes in each row indicates the load present at the sorting machine output corresponding to that row at the end of the first sorting cycle; while the sum of the numbers assigned to the boxes in each column indicates the load present at the sorting machine output corresponding to that column at the end of the second sorting cycle.

A generic mail sorting process therefore comprises creating an empty matrix; assigning the delivery locations to the matrix boxes according to the above assignment criterion to conform with the delivery order of the mail items; and creating the electronic table memorized in electronic unit 22, and which provides for determining the sorting machine outputs to which the mail items are to be directed.

Between assigning the delivery locations to the matrix boxes and creating the sorting table, a balancing step is also normally performed to balance the load at the sorting machine outputs at the end of the first and second sorting cycle, and so prevent one or more outputs from being filled completely, which would inevitably call for interrupting the sorting process to clear the outputs.

More specifically, while still conforming with the assignment order, the balancing step makes changes to the delivery location to matrix box assignments to distribute the mail items as evenly as possible between the sorting machine outputs in both the first and second sorting cycle.

In the light of the foregoing description, the innovative principle of the present invention may now be explained more clearly.

The optimization method according to the present invention stems from the fact that the cost of sorting a mail batch on a sorting machine having a predetermined number of outputs substantially depends on two distinct factors: the time taken to feed in and sort the mail items, i.e. the number of mail items fed into the input and sorted into the outputs of the sorting machine in each sorting cycle; and the time taken to remove the mail items at the end of each sorting cycle, i.e. the number of mail items which, at the end of each sorting cycle, are removed in orderly manner from the sorting machine outputs and fed back into the sorting machine input for the next sorting cycle.

Therefore, unlike known sorting processes wherein all the mail items in the batch are removed at the end of each sorting cycle—either for the next sorting cycle or because the process is terminated—the optimization method according to the present invention is based on the principle of only removing part of the mail items in the batch at the end of each sorting cycle, so that some of the mail items are put through all the sorting cycles in the sorting process, and others through fewer sorting cycles, thus reducing the running time and cost referred to above, without necessarily increasing the number of output clearing operations or reducing the number of addresses that can be processed.

Figure 2B:
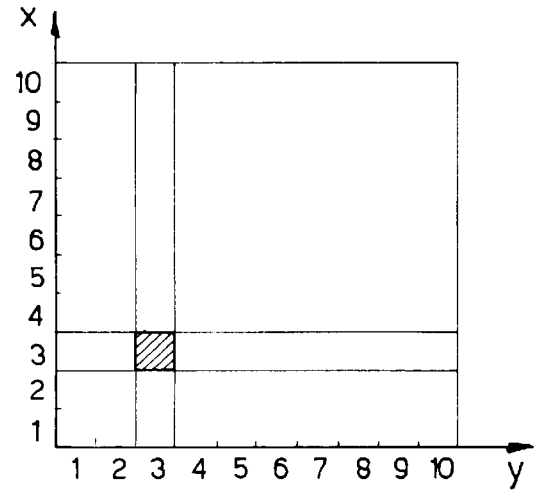

In addition, the optimization method according to the present invention also stems from the fact that the mail items of a delivery location assigned to a diagonally located box in the FIG. 2a matrix—shown more clearly in FIG. 2b—are sorted into the same sorting machine output in both the first and second sorting cycle.

Consequently, if a sorting machine output is reserved for the mail items of a delivery location assigned to a diagonally located matrix box, the mail items in that output need not be removed at the end of the first sorting cycle, thus saving in output clearing resources and in time and cost.

For the mail items of a given delivery location to be only sorted in the first cycle and not removed from the corresponding sorting machine output for the second cycle, not only must the delivery location be assigned to a diagonally located matrix box, but delivery locations must also be prevented from being assigned to other matrix boxes in the same row, so that no mail items, other than those of the delivery location related to the diagonally located box, are sorted into the machine output related to that particular row.

Assuming, however, the output referred to is not cleared at the end of the first sorting cycle, nothing prevents other mail items, located in outer outputs in the first sorting cycle, from being superimposed on those in the uncleared output in the second sorting cycle.

Such a situation—in which, at the end of the first sorting cycle, one machine output only contains mail items relative to one delivery location, and which are superimposed, in the second sorting cycle, with others sorted from other machine outputs at the end of the first sorting cycle—can be represented by the irregular matrix shown in FIG. 2c, which is obtained by modifying the regular matrix in FIGS. 2a and 2b as described below.

Figure 2C:
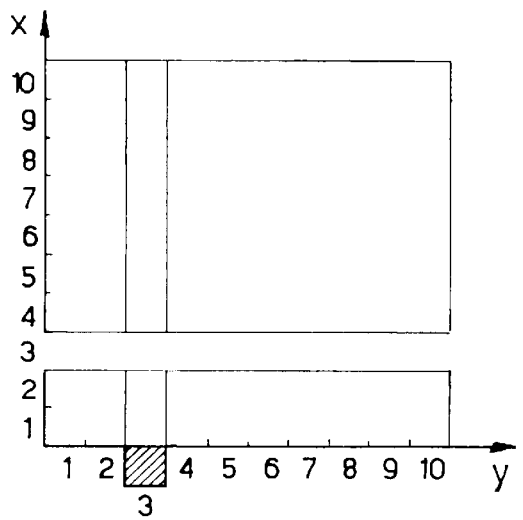

In particular, the FIG. 2c matrix has the following characteristics:

the row containing the diagonally located box shown in FIG. 2b is eliminated, so as to prevent any other delivery locations from being assigned to the other boxes in the row, and so prevent any other mail items, besides those of the delivery location related to the diagonally located box, from being sorted into the machine output related to that row; and the FIG. 2b box is no longer located diagonally, but, still in the same column, in a row beneath the first row in the matrix and hereinafter referred to as the "bottom row".

Figure 2D:
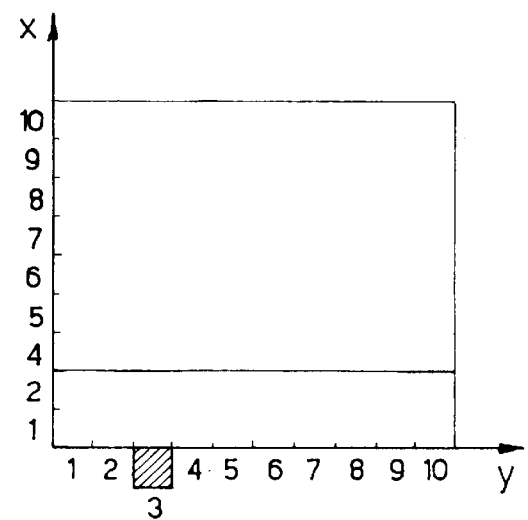

Altering the FIG. 2c matrix graphically to eliminate the gap left by the missing row (i.e. "compacting" the matrix) gives the matrix shown in FIG. 2d, in which the pre-existing relation between the matrix rows and sorting machine outputs still applies.

Figure 2E:
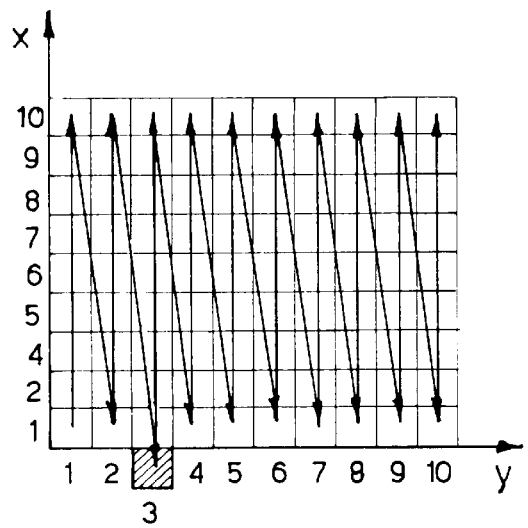

More specifically, the FIG. 2d matrix is an irregular matrix, in which the properties of the standard matrix representation are preserved, i.e.

the boxes in each row are assigned delivery locations whose mail items are sorted into the output related to that row in the first sorting cycle;

the mail items only undergoing the first sorting cycle are sorted into the machine output related to the missing row;

the boxes in each column are assigned delivery locations whose mail items are sorted into the machine output related to that column in the second sorting cycle;

the delivery locations are assigned to the matrix boxes according to said ascending column and row assignment criterion to conform with the delivery order; FIG. 2e shows the order in which the delivery locations are assigned to the boxes in the irregular matrix shown in FIG. 2d.

The irregular matrix in FIG. 2d comprises a number of complete rows equal to the difference between the number of sorting machine outputs assigned to the sorting process, and the number of delivery locations to be processed as described above, i.e. only putting the relative mail items through the first sorting cycle, not removing them from the relative machine outputs, and sorting other mail items on top of then in the second sorting cycle.

Figure 2F:
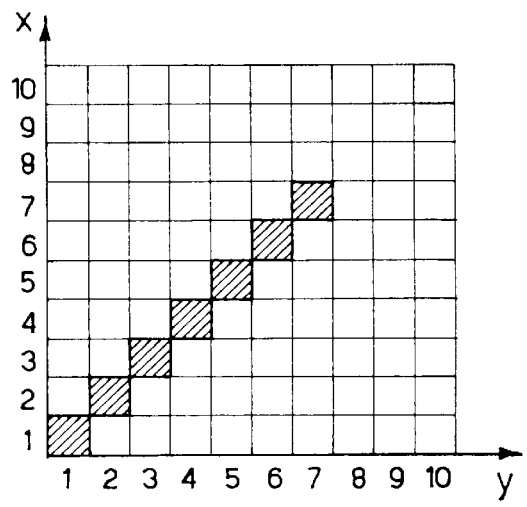
Figure 2G:
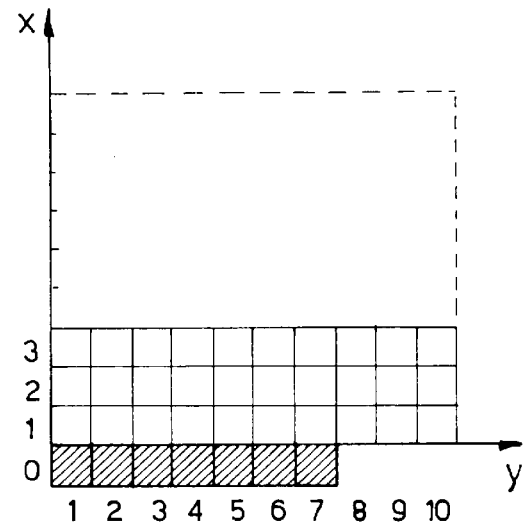

To process a number of delivery locations as described above, the standard matrix representation must be altered accordingly for each one as shown in FIGS. 2f and 2g. More specifically, the hatching in FIG. 2f shows the diagonally located boxes assigned delivery locations for one-cycle processing; and FIG. 2g shows the irregular matrix obtained by altering the FIG. 2f matrix as described above.

The FIG. 2g matrix has an incomplete bottom row containing a number of boxes equal to the number of delivery locations for one-cycle processing; and a number of complete rows equal to the number of sorting machine outputs into which the mail items removed for the second cycle are sorted.

In the irregular matrix in FIG. 2g, all the rows are renumbered, and the bottom row assigned a zero identification number.

Assigning a zero identification number to the bottom row has a precise meaning, which has to do with the relation between the sorting process and corresponding matrix representation.

That is, since the mail items of delivery locations assigned to the boxes in the bottom row are only put through the first sorting cycle and are not removed from the relative machine outputs until the end of the second sorting cycle, these mail items occupy the same machine outputs in both the first and second sorting cycle, and, in the first sorting cycle, must therefore be sorted into the machine outputs indicated by the identification numbers of the columns in the irregular matrix, i.e. into the machine outputs related to the irregular matrix columns to which the delivery locations of the mail items belong.

In other words, the mail items of delivery locations assigned to boxes in the bottom row may be said to be sorted, in the first sorting cycle, on the basis of second sorting cycle "addresses".

In other words, for the delivery locations assigned to the boxes in the bottom row, the identification number of the bottom row has no significance and is therefore assigned a zero number.

In an irregular matrix representation of the type shown in FIG. 2g, the identification number of the bottom row therefore precedes those of all the other rows in the matrix (from 1 to NR), and the mail items of delivery locations assigned to the boxes in the bottom row are located, at the end of the second sorting cycle, in the relative outputs before all the other mail items.

Renumbering the rows in the irregular FIG. 2g matrix also alters the relationship described above between the rows in the matrix and the machine outputs in the first sorting cycle, which new relationship is easily deducible from the previous one.

In the irregular FIG. 2g matrix, the identification numbers of the rows still represent the order in which the mail items must be recirculated, and the identification numbers of the columns still represent the order in which the mail items are subsequently processed, e.g. during actual delivery.

It should also be pointed out that, whereas, in a standard regular matrix representation of the type shown in FIG. 2a, column i and row i are assigned the same machine output in both the first and second sorting cycle, in the irregular matrix representation in FIG. 2g, this rule in general no longer applies, i.e. column i and row i may, though not necessarily, be assigned different machine outputs in the first and second sorting cycle.

During the sorting process, therefore, once constructed, the irregular FIG. 2g matrix is simply balanced and the sorting rules derived from it as described previously.

In short, the optimization method according to the present invention is based on the principle of not processing all the delivery locations in the same way, but, for example, of distinguishing, as described in detail later on, which are to be put through all the sorting cycles in the process, and which through a smaller number of sorting cycles.

This therefore amounts to assigning to a first group of delivery locations a first sorting identifier indicating which sorting cycles the mail items of the first group of delivery locations are to undergo; and, to a second group of delivery locations, a second sorting identifier different from the first and indicating which sorting cycles the mail items in the second group of delivery locations are to undergo.

Each mail item is therefore put through the sorting cycles indicated by the sorting identifier of the mail item delivery location.

More specifically, in a two-cycle sorting process, the possible sorting identifiers are $\{1, 2\}$ and $\{1\}$: the first indicating that the mail items of the delivery locations indicated by that sorting identifier are to undergo both the first and second sorting cycle; and the second indicating that the mail items of the delivery locations indicated by that sorting identifier are only to undergo the first sorting cycle.

In a two-cycle sorting process, therefore, not only the two sorting identifiers are different, but also the numbers of sorting cycles indicated by the two sorting identifiers.

In the actual course of a two-cycle sorting process, therefore, some of the mail items are sorted in the first cycle into a first group of machine outputs from which they are not removed until the end of the sorting process, while all the other mail items are sorted in the first cycle into a second group of machine outputs from which they are removed in orderly manner for the second sorting cycle.

In the second sorting cycle, the mail items are therefore sorted into all the machine outputs, and not only those into which the mail items of the delivery locations in the first group have already been sorted.

The delivery locations which are only to undergo the first sorting cycle are determined according to a formation criterion based on the principle of maximizing the mail traffic which is not removed from the machine outputs at the end of the first sorting cycle to undergo the second sorting cycle, which amounts to minimizing the time required to perform the sorting process.

Maximizing the mail traffic which is not removed from the machine outputs at the end of the first sorting cycle therefore minimizes not only the time taken by clearing resources to clear the machine outputs at the end of the first sorting cycle, and the time taken to feed the mail items removed from their outputs at the end of the first sorting cycle back into the machine input, but also the mail traffic sorted in the second cycle, thus reducing the time taken to perform the second cycle with respect to a standard sorting cycle.

Maximizing the mail traffic not removed from the machine outputs at the end of the first sorting cycle therefore calls for sorting in one cycle the maximum possible number of mail items compatible with the capacity of the machine, which means sorting in one cycle the mail items of "heavy", i.e. high-mail-load, delivery locations, and also putting through the second sorting cycle the mail items of "light", i.e. low-mail-load, delivery locations.

By maximizing the mail traffic not removed from the machine outputs at the end of the first sorting cycle, the number of times the mail items are fed on average through the machine is less than two, and asymptotically approaches 1 as the mail traffic sorted in the first cycle gets larger.

In the following description, the machine outputs into which are sorted mail items undergoing only the first sorting cycle, and from which the mail items are not removed until the end of the sorting process, will be referred to as "main outputs"; and the machine outputs into which are sorted mail items which are removed from the outputs to undergo the second sorting cycle will be referred to as "recirculating outputs".

Obviously, the total number of machine outputs equals the number of main outputs plus the number of recirculating outputs, and, in the second sorting cycle, no distinction is made between main and recirculating outputs on account of the mail items, in the second cycle, being sorted into all the machine outputs.

Figure 3A:
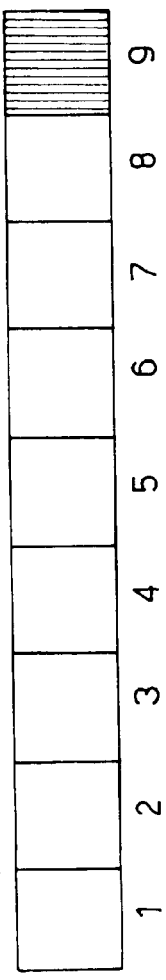
FIGS. 3a, 3b and 3c show, schematically, the arrangement of the mail items in the sorting machine outputs in the course of a sorting process comprising two sorting cycles and optimized in accordance with the present invention.
Figure 3B:
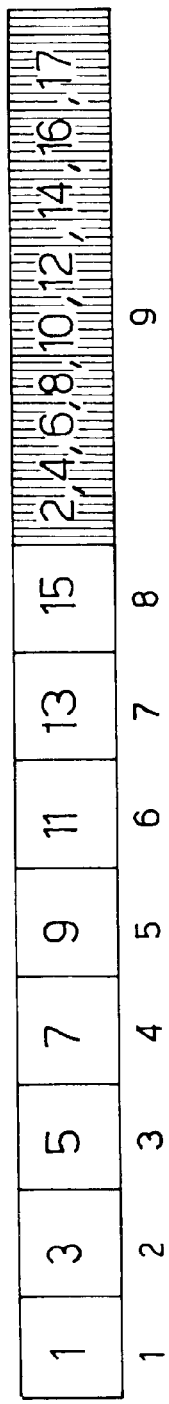
Figure 3C:
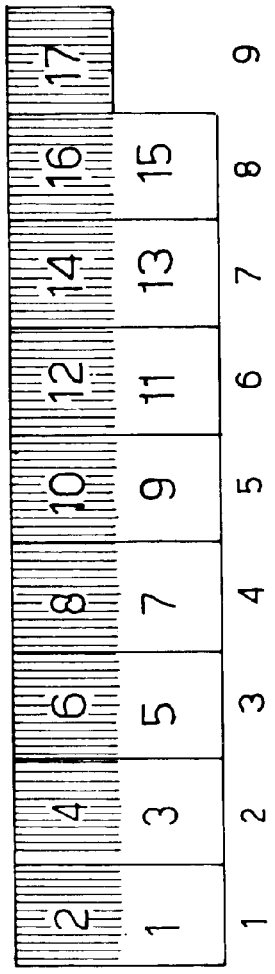

FIGS. 3a, 3b and 3c show, schematically, the arrangement of the mail items in the machine outputs prior to commencement of the sorting process, at the end of the first sorting cycle, and at the end of the second sorting cycle respectively; the last two being obtained implementing the first optimization procedure.

In the example shown in FIGS. 3a, 3b, 3c, the mail batch has seventeen delivery locations, and the sorting machine has a total number of nine outputs, one recirculating output, and eight main outputs.

FIG. 3a shows, schematically, the initial machine output situation prior to commencement of the sorting process, and in which the nine machine outputs are represented by a vector of nine boxes—one for each output—indicated by respective identification numbers increasing consecutively from 1 to 9 from the leftmost to the rightmost box in the vector.

More specifically, the first eight unmarked boxes in the vector represent the eight main outputs, and the hatched ninth box represents the recirculating output.

In FIG. 3a, the seventeen mail batch delivery locations are shown over the vector and indicated by respective identification numbers increasing consecutively from 1 to 17 and separated by commas.

FIG. 3b shows a similar schematic to the one in FIG. 3a, and which illustrates the relationship between the delivery locations and the machine outputs at the end of the first sorting cycle, and therefore the actual arrangement of the mail items of the delivery locations in the machine outputs.

More specifically, the first eight boxes, representing the eight main machine outputs, in the FIG. 3b vector indicate the eight delivery locations whose mail items, after the first sorting cycle, are not removed from the machine outputs for the second sorting cycle; and the ninth box, representing the recirculating output, indicates the delivery locations whose mail items, after the first sorting cycle, are removed from the machine outputs for the second sorting cycle.

The FIG. 3c schematic, on the other hand, shows the relationship between the delivery locations and the machine outputs at the end of the second sorting cycle.

More specifically, FIG. 3c shows an irregular two-row matrix of the type shown in FIG. 2g and comprising a first row (bottom row) having a number of boxes equal to the number of main machine outputs, and a second row having a number of boxes equal to the total number of machine outputs.

The bottom row comprises a first vector defined by the first eight boxes in the FIG. 3b vector and therefore showing the relationship between the main machine outputs and the delivery locations to be put through only the first sorting cycle; and the second row comprises a second vector showing the relationship between the machine outputs and the delivery locations also to be put through the second sorting cycle, and the mail items of which were in the recirculating output at the end of the first sorting cycle.

As explained previously, each column in the FIG. 3c matrix shows the mail item arrangement in a respective machine output—both main and recirculating—at the end of the second sorting cycle; and each row in the FIG. 3c matrix, with the exception of the first (in the example shown, the second row), shows the mail item population in a respective recirculating output of the machine at the end of the first sorting cycle.

More specifically, the first box (bottom row) in each column shows the delivery location whose mail items were only put through the first sorting cycle, were not removed from the respective output for the second sorting cycle, and were therefore deposited physically first into the output; and the second box (second row) in each column shows the delivery location whose mail items were removed from the recirculating output at the end of the first sorting cycle, were fed back into the machine for the second sorting cycle, and were deposited on top of the mail items already in the output.

The second row in the FIG. 3c matrix shows the mail item population in the recirculating output of the machine at the end of the first sorting cycle.

More specifically, the first box (first column) in the second row of the matrix shows the delivery location whose mail items are located in the recirculating output at the end of the first sorting cycle and are physically sorted on top of the items already inside the first output at the end of the second sorting cycle; the second box (second column) in the second row of the matrix shows the delivery location whose mail items are located in the recirculating output at the end of the first sorting cycle and are physically sorted on top of the items already inside the second output at the end of the second sorting cycle, and so on.

It should be stressed that the irregular matrix representation in FIG. 3c shows the relationship between the delivery locations and machine outputs at the end of a sorting process comprising a first and second sorting cycle and one recirculating output for the second sorting cycle.

A representation of the relationship between the delivery locations and machine outputs at the end of a sorting process comprising a first and second sorting cycle and more than one recirculating output is a generalization of the FIG. 3c matrix.

More specifically, a sorting process comprising a first and second sorting cycle and more than one recirculating output may be represented by an irregular matrix having a number of rows equal to the number of recirculating outputs plus one, and in which the bottom row has a number of boxes equal to the number of main machine outputs, and the other rows have a number of boxes equal to the number of main and recirculating outputs on the machine.

FIG. 3c also shows clearly the order in which the delivery locations are assigned to the matrix boxes. That is, the first delivery location, indicated "1", is assigned to the bottom-row box in the first column; the second delivery location, indicated "2", is assigned to the second-row box in the first column; the third delivery location, indicated "3", is assigned to the bottom-row box in the second column, and so on.

In the FIG. 3c matrix, the number of delivery locations in the mail batch for processing equals the number of matrix boxes, i.e. the number of delivery locations addressable in the sorting process.

In such a situation, none of the matrix boxes is vacant, i.e. without an assigned delivery location, and the order, described above, in which the delivery locations are assigned to the matrix boxes must be as shown in FIG. 3c, with the odd-number delivery locations in the bottom row, and the even-number delivery locations in the second row.

This arrangement, however, with no vacant boxes and with the odd-number delivery locations in the bottom row, is an exceptional case.

In a generic matrix representation of the type shown in FIG. 3c and having more than two rows, the number of boxes is normally greater than the delivery locations in the mail batch, so that some of the boxes are vacant, and the bottom row does not necessarily only contain odd-number delivery locations.

In the course of the optimization procedure, in fact, the search for delivery locations by which to maximize the mail traffic processed in the first sorting cycle may, and often does, locate a high-traffic delivery location which, in the assignment order, should be assigned to a box in other than the bottom row, but which the optimization procedure would tend to assign to a bottom-row box to maximize the traffic processed in the first sorting cycle.

Such a delivery location, however, may only be assigned to a bottom-row box, i.e. be selected to maximize the traffic processed in the first sorting cycle, providing it does not conflict with the delivery location assignment order.

More specifically, such an assignment can only be made in conformance with the delivery location to matrix box assignment order, on condition that:

the delivery location is assigned to a bottom-row box in the column following the one to which it should be assigned in the assignment order; and the number of matrix boxes succeeding, in the assignment order, the bottom-row box to which the delivery location should be assigned is sufficient to assign the delivery locations succeeding the one considered in the assignment order.

In other words, the second condition is only met if the number of boxes succeeding the bottom-row box to which the delivery location should be assigned—i.e. the number of boxes in all the matrix rows to the right of said box, plus the number of recirculating rows to also take into account the boxes on top of it—is at least equal to the number of delivery locations still to be assigned and succeeding, in the assignment order, the delivery location assigned to said bottom-row box.

Assigning a delivery location to a bottom-row box as opposed to the one called for in the assignment order inevitably results in a loss of delivery location to matrix box addressability, depending on the position, within the column, of the box to which the delivery location should be assigned in the assignment order.

In the FIG. 3c matrix, for example, assigning delivery location "8" to the bottom-row box in the fifth column (i.e. the box assigned delivery location "9"), as opposed to the second-row box in the fourth column, would undoubtedly result—upstream, in the assignment order, from the box to which delivery location "8" is assigned—in a vacant box to which no delivery location will be assigned. So that, with respect to the total number of matrix boxes, shifting delivery location "8" results in the loss of a box to which to assign a delivery location, i.e. results in a loss of addressability.

A delivery location may therefore only be assigned to a bottom-row box, as opposed to the one called for in the assignment order, providing residual addressability is such as to permit assignment of the delivery locations succeeding the one in question in the assignment order. As such, residual addressability, calculated as described in detail later on, may be used as an index by which to determine whether or not a delivery location may be assigned to a bottom-row box as opposed to the one called for in the assignment order.

Assigning a delivery location to a bottom-row box as opposed to the one called for in the assignment order also results in a loss of total machine capacity, and can therefore only be done providing the total capacity of the machine is sufficient to sort the assigned delivery locations.

A first embodiment of the optimization method according to the present invention will now be described with reference to FIG. 4 and a sorting process comprising two sorting cycles.

Figure 4:
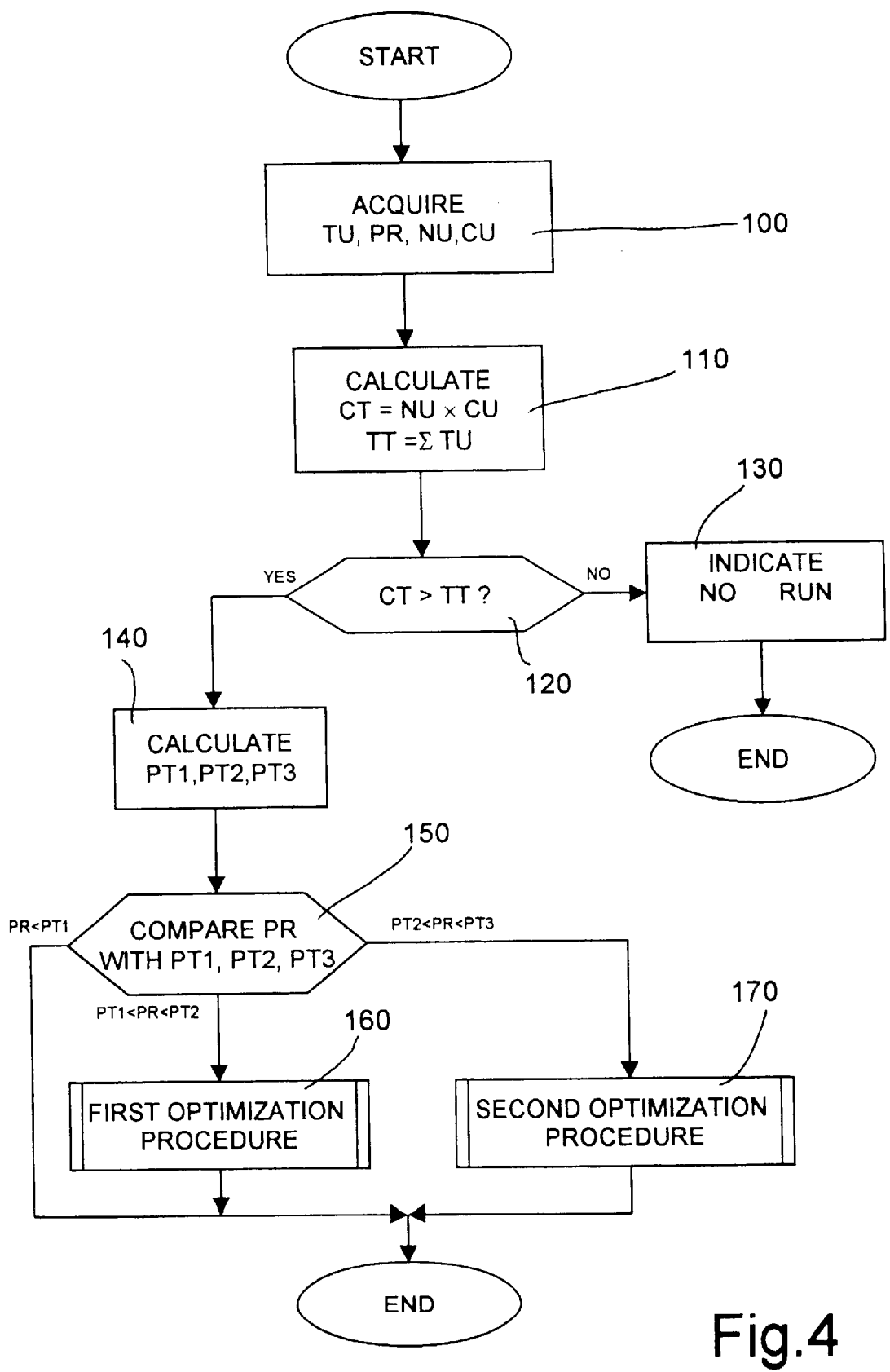
FIG. 4 shows an overall flow chart of the optimization method according to the present invention.

As shown in FIG. 4, to begin with, a first block 100 acquires a number of parameters relative to the characteristics of the mail batch for processing and the sorting machine used. More specifically, block 100 acquires:

the number PR and identification data of the delivery locations in the mail batch for sorting;

the predicted mail traffic TU of each delivery location, which may be determined from historical or real available data;

the total number NU of machine outputs assigned to process the mail batch; and the capacity CU of each output, i.e. the maximum number of mail items each machine output can accommodate.

Block 100 goes on to a block 110, which, on the basis of the data acquired in block 100, calculates the total capacity CT of the machine by multiplying the total number NU of outputs assigned to the sorting process by the capacity CU of each output, and the total traffic TT of the mail batch by adding the mail traffics TU of all the delivery locations.

Block 110 goes on to a block 120, which determines whether the total capacity CT of the machine is greater than total traffic TT.

If total capacity CT is greater than total traffic TT (YES output of block 120), then the sorting process can be run, and block 120 goes on to a block 140; conversely, if total capacity CT of the machine is less than total traffic TT (NO output of block 120), the sorting process cannot be run due to insufficient sorting capacity of the machine, and block 120 goes on to a block 130 which indicates a no run.

Block 140 determines, according to the equation PT=NU^NC, three values PT1, PT2, PT3 indicating the number of delivery locations addressable in the sorting process using all NU machine outputs and performing NC sorting cycles, where NC equals 1, 2, 3 respectively.

Block 140 goes on to a block 150, in which the number PR of delivery locations in the mail batch is compared with the calculated PT1, PT2, PT3 values to determine the type of optimization procedure to perform.

More specifically:

if the number PR of delivery locations in the mail batch is less than the number PT1 of delivery locations addressable in one sorting cycle, then no optimization of the sorting process is required, the optimization method is terminated, and the sorting process commenced;

if the number PR of delivery locations in the mail batch lies between the number PT1 of delivery locations addressable in one sorting cycle, and the number PT2 of delivery locations addressable in two sorting cycles, then block 150 goes on to a block 160, which performs a first sorting process optimization procedure (the sorting process in this case comprising two sorting cycles) as described in detail later on with reference to FIGS. 5a–5b and 6; and if the number PR of delivery locations in the mail batch lies between the number PT2 of delivery locations addressable in two sorting cycles, and the number PT3 of delivery locations addressable in three sorting cycles, then block 150 goes on to a block 170, which performs a second sorting process optimization procedure (the sorting process in this case comprising three sorting cycles) as described in detail later on.

The first optimization procedure—performed when the number PR of delivery locations in the mail batch lies between the number PT1 of delivery locations addressable in one sorting cycle, and the number PT2 of delivery locations addressable in two sorting cycles—provides for dividing the number PR of delivery locations in the mail batch into a separate first and second group of delivery locations, wherein the mail items of the delivery locations in the first group are only put through the first sorting cycle, and the mail items of the delivery locations in the second group are put through both the first and second sorting cycle.

Figure 5A:
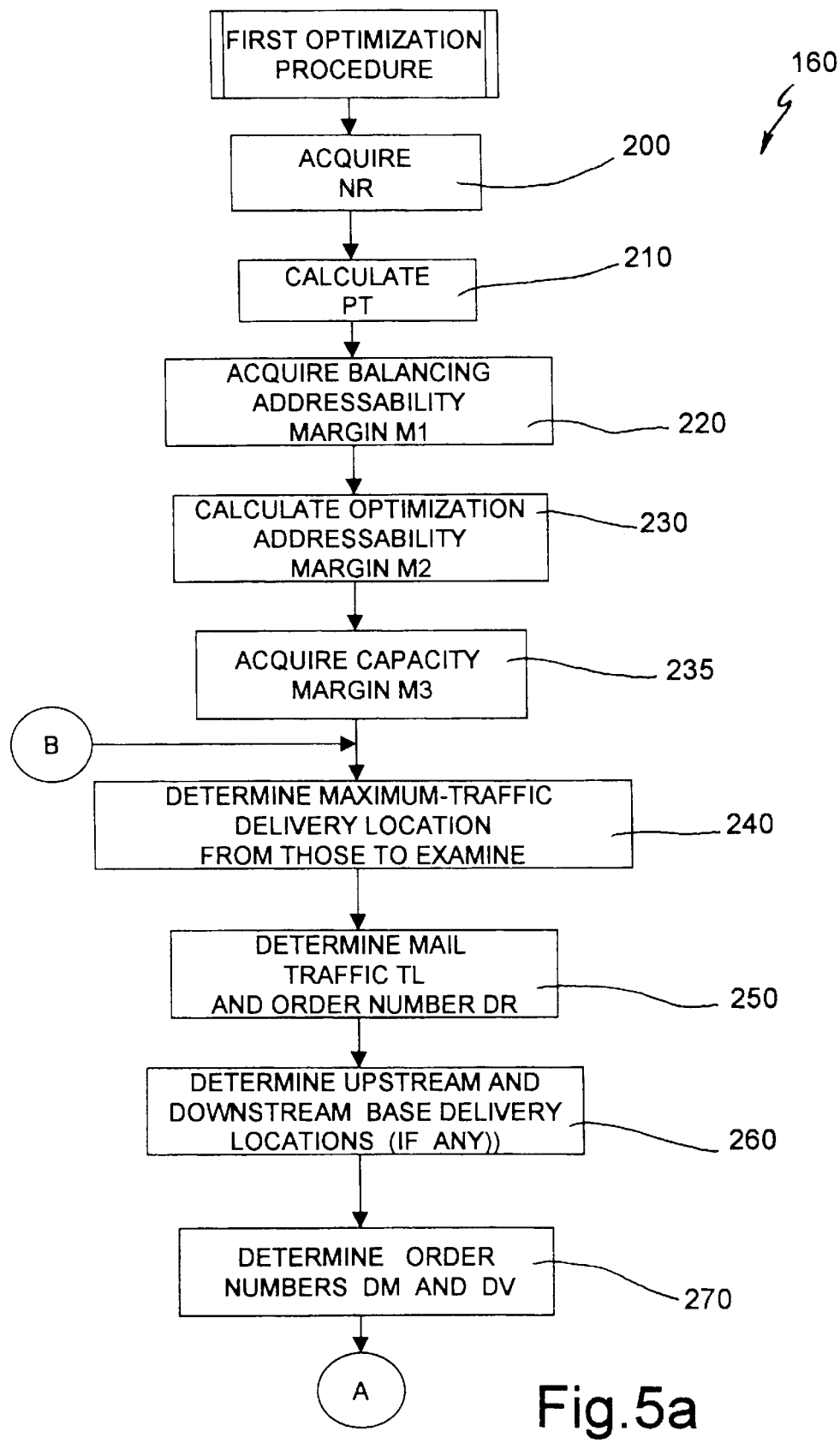
FIGS. 5a and 5b show a flow chart of a first optimization procedure forming part of the optimization method according to the present invention.
Figure 5B:
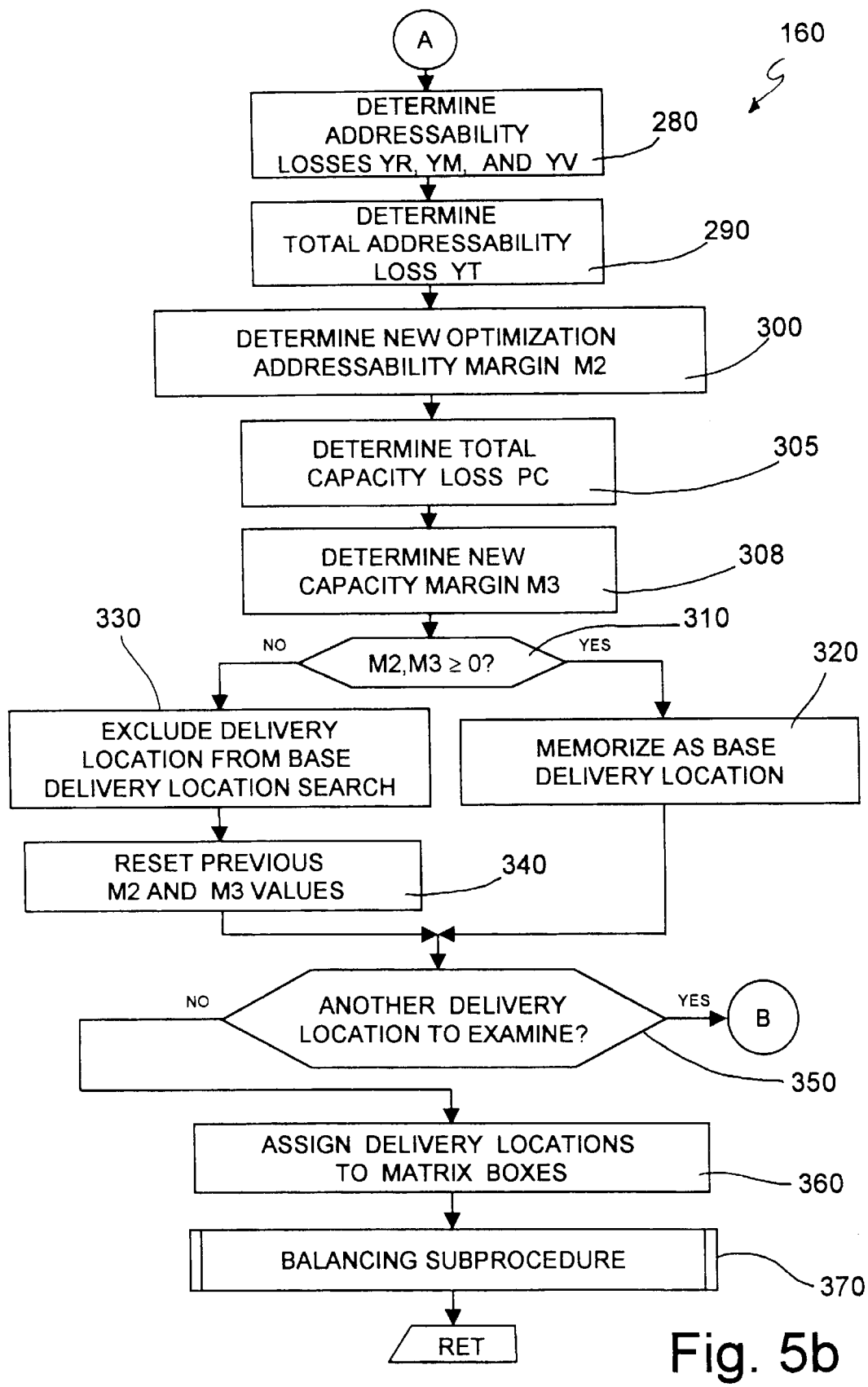

FIGS. 5a and 5b show a flow chart of the operations performed in the first optimization procedure.

As shown in FIGS. 5a, 5b, to begin with, a first block 200 acquires the number NR of recirculating outputs on the machine.

This number may either be entered externally by an operator, or be determined by a special procedure on the basis of the mail batch parameters and machine capacity.

It should be stressed that the number of recirculating outputs is closely related to the type of machine utilization inefficiency being dealt with, and which may occur, as stated, when the number of delivery locations to be addressed is slightly higher than the maximum number actually addressable in the sorting process using one sorting cycle, but is well below the maximum number actually addressable using two sorting cycles, or when the number of delivery locations to be addressed is comparable with the maximum number actually addressable in the sorting process using two sorting cycles, but certain delivery locations have such a high mail traffic as to fill the assigned machine outputs on their own.

In the first case, most of the mail items can be sorted completely in one sorting cycle, the number of mail items exceeding the sorting capacity of the machine in the first sorting cycle is relatively small, and the number of main outputs is therefore far greater than the number of recirculating outputs. In the second case, the maximum number of recirculating outputs is deduced from the number of high-mail-traffic delivery locations to be sorted in one cycle, and the number of recirculating outputs employed is normally greater than in the first case.

With reference again to FIGS. 5a, 5b, block 200 goes on to a block 210, which calculates the number PT of delivery locations addressable in the sorting process, according to the equation:

$$PT=(NU-NR)+(NU \cdot NR)$$

where NU−NR represents both the number NP of main machine outputs and the number of delivery locations addressable in the first sorting cycle (i.e. the number of bottom-row boxes in the matrix); and NU·NR represents the number of delivery locations addressable in the second sorting cycle (i.e. the number of boxes in the other matrix rows).

Block 210 goes on to a block 220, which acquires a balancing addressability margin M1 expressed as a percentage value and indicating the number of matrix boxes which are not to be assigned delivery locations in the first optimization procedure, so as to be available for a subsequent balancing step, as described in detail later on. The balancing addressability margin M1 may, for example, be 10% or at any rate greater than 1/NU expressed as a percentage.

Block 220 goes on to a block 230, which calculates an optimization addressability margin M2 indicating the maximum addressability loss allowed in the search for delivery locations to maximize the mail traffic sorted in the first cycle, i.e. the maximum number of vacant boxes that can be formed in the search as a result of assigning delivery locations to bottom-row boxes as opposed to those called for in the assignment order.

More specifically, the optimization addressability margin M2 is a function of the number PR of delivery locations in the mail batch, the number PT of delivery locations addressable in the sorting process, and the balancing addressability margin M1, according to the equation:

$$M2=PT-PR\cdot(1+M1)$$

Block 230 goes on to a block 235, which acquires a sorting capacity margin M3 indicating the maximum machine sorting capacity loss allowed in the search for delivery locations to maximize the mail traffic sorted in the first cycle.

Block 235 goes on to a series of blocks, which search for the delivery locations by which to maximize the mail traffic sorted in the first cycle, so as to form a list of delivery locations for entry into the bottom matrix row, and which, hereinafter, will be referred to as "base delivery locations".

More specifically, block 235 goes on to a block 240, which determines the maximum-traffic delivery location from those in the mail batch not yet considered for assignment to the bottom matrix row.

Block 240 goes on to a block 250, which, for the delivery location determined in block 240, determines, not only mail traffic TL, but also an order number DR indicating the position of the delivery location within the mail batch delivery location sequence defined by the delivery order, i.e. the order number of the delivery location in the assignment order.

Block 250 goes on to a block 260, which, from the base delivery locations already assigned to the bottom matrix row (none initially), determines the base delivery location immediately upstream and immediately downstream, in the assignment order, from the delivery location considered, and which hereinafter will be referred to as the upstream base delivery location and downstream base delivery location respectively.

More specifically, of the base delivery locations upstream from the delivery location considered, the upstream base delivery location is the one "closest", in the assignment order, to the delivery location considered; and, of the base delivery locations downstream from the delivery location considered, the downstream base delivery location is the one "closest", in the assignment order, to the delivery location considered.

If there are no base delivery locations upstream from the delivery location considered, a first dummy delivery location, which is also upstream from the first delivery location in the mail batch, is defined as the upstream base delivery location; and, if there are no base delivery locations downstream from the delivery location considered, a second dummy delivery location, which is also downstream from the last delivery location in the mail batch, is defined as the downstream base delivery location.

Block 260 goes on to a block 270, which determines a first and second order number DM and DV respectively indicating the position of the upstream base delivery location and the downstream base delivery location within the mail batch delivery location sequence defined by the delivery order, i.e. the order number of the delivery location in the assignment order; the first and second dummy delivery location being assumed to have order numbers of zero and PR+1 respectively, so that the new base delivery location is always located between another two, possibly dummy, base delivery locations.

Block 270 goes on to a block 280, which determines:

the intermediate addressability loss YR between the upstream and downstream base delivery locations determined in block 260, i.e. the number of vacant boxes formed between the box assigned the upstream base delivery location and the box assigned the downstream base delivery location, as a result of assigning the delivery location considered to a bottom-row box as opposed to the one called for in the assignment order;

the upstream addressability loss YM upstream from the upstream base delivery location, i.e. the number of vacant boxes formed upstream from the box assigned the upstream base delivery location, as a result of assigning the delivery location considered to a bottom-row box as opposed to the one called for in the assignment order; and the downstream addressability loss YV downstream from the downstream base delivery location, i.e. the number of vacant boxes formed downstream from the box assigned the downstream base delivery location, as a result of assigning the delivery location considered to a bottom-row box as opposed to the one called for in the assignment order.

More specifically, intermediate addressability loss YR, upstream addressability loss YM, and downstream addressability loss YV are determined according to the following equations:

$$\begin{cases} YR = \begin{cases} Y_0(DV) & \text{if } DV = 0 \\ Y_1(DV - DM) & \text{if } DV > 0 \end{cases} \\ YM = \begin{cases} Y_0(DR) & \text{if } DV = 0 \\ Y_1(DR - DV) & \text{if } DV > 0 \end{cases} \\ YV = Y_1(DV - DR) \end{cases}$$

where:

$$\begin{cases} Y_0(x) = (NR+1) + \text{Remainder}\left(\frac{x}{NR+1}\right) \\ Y_1(x) = NR - \text{Remainder}\left(\frac{x-1}{NR+1}\right) \end{cases}$$

Block 280 goes on to a block 290, which calculates a total addressability loss YT, as a result of assigning the delivery location considered to a bottom-row box as opposed to the one called for in the assignment order, according to the equation:

$$YT=YR-YM-YV$$

Block 290 goes on to a block 300, which calculates a new optimization addressability margin M2 by subtracting total addressability loss YT from the previous optimization addressability margin M2, i.e.

$$M2 \leftarrow M2-YT$$

Block 300 goes on to a block 305, which calculates the sorting capacity loss PC of the machine as a result of assigning a delivery location to the bottom matrix row.

More specifically, sorting capacity loss PC may be calculated as follows.

In general:

$$\begin{cases} \sum_{i=DM}^{DV-1} TL_i \le CU \cdot N_{MV} \\ \sum_{i=DM}^{DR-1} TL_i \le CU \cdot N_{MR} \\ \sum_{i=DR}^{DV-1} TL_i \le CU \cdot N_{RV} \end{cases}$$

where:

$TL_i$ is the mail traffic of the i-th delivery location (where i is the order number indicating the position of the delivery location in the delivery location sequence of the mail batch to be sorted);

DV is the order number indicating the position of the base delivery location immediately downstream from the i-th delivery location in the delivery location sequence of the mail batch to be sorted;

DM is the order number indicating the position of the base delivery location immediately upstream from the i-th delivery location in the delivery location sequence of the mail batch to be sorted;

DR is the order number indicating the position, in the delivery location sequence of the mail batch to be sorted, of the delivery location likely to become a base delivery location;

CU is the operating capacity of each machine output (i.e. the physical capacity minus the margin which is statistically intended to be left free);

$N_{MV}$ is the number of machine outputs required to contain the traffic of the group of delivery locations with order numbers from DM to DV−1, and can be calculated as follows:

$$N_{MV} = upint\left(\frac{\sum_{i=DM}^{DV-1} TL_i}{CU}\right)$$

where upint is the upper integer.

$N_{MR}$ is the number of machine outputs required to contain the traffic of the group of delivery locations with order numbers from DM to DR−1, and can be calculated as follows:

$$N_{MR} = upint\left(\frac{\sum_{i=DM}^{DR-1} TL_i}{CU}\right)$$

where upint is the upper integer.

$N_{RV}$ is the number of machine outputs required to contain the traffic of the group of delivery locations with order numbers from DR to DV−1, and can be calculated as follows:

$$N_{RV} = upint\left(\frac{\sum_{i=DR}^{DV-1} TL_i}{CU}\right)$$

where upint is the upper integer.

Sorting capacity loss PC therefore equals:

$$PC = CU \cdot (N_{MR} + N_{RV} - N_{MV})$$

which, in relative terms, i.e. referred to the total capacity of the machine, equals:

$$PC_\% = \frac{(N_{MR} + N_{RV} - N_{MV})}{NU}$$

Block 305 goes on to a block 308, which calculates the current sorting capacity margin M3 by subtracting sorting capacity loss PC from the previous sorting capacity marg in M3, i.e.:

$$M3 \leftarrow M3 - PC$$

Block 308 goes on to a block 310, which determines whether the optimization addressability margin M2 calculated in block 300 and the sorting capacity margin M3 calculated in block 308 are both greater than or equal to zero, so as to determine whether or not the delivery location in question can be assigned to the bottom matrix row.

If optimization addressability margin M2 and sorting capacity margin M3 are both greater than or equal to zero (YES output of block 310), then the delivery location considered can be assigned to the bottom matrix row, by optimization addressability and sorting capacity margins M2 and M3 indicating the possibility of still assigning the succeeding delivery locations to the matrix boxes in conformance with the assignment order; in which case, block 310 goes on to a block 320. Conversely, if even only one of optimization addressability and sorting capacity margins M2 and M3 is less than zero (NO output of block 310), then the delivery location considered cannot be assigned to the bottom matrix row, by the less-than-zero margin indicating the impossibility, if such an assignment were to be made, of assigning the succeeding delivery locations to the matrix boxes in conformance with the assignment order; in which case, block 310 goes on to a block 330.

Block 320 therefore memorizes that the delivery location considered is a base delivery location, e.g. by entering the order number of the delivery location onto a list formed beforehand, or by assigning the delivery location a logic indicator (flag) having a predetermined logic value (e.g. 1). Block 320 then goes on to a block 350 described below.

In block 330, on the other hand, the delivery location considered is excluded from any further base delivery location search operations, e.g. by memorizing it as such as described with reference to block 320.

Block 330 goes on to a block 340, which resets the previous optimization addressability margin M2 and sorting capacity margin M3 values, at least one of which had become less than zero.

Block 340 goes on to block 350, which determines whether there is another delivery location to examine and succeeding the one considered according to the above assignment criterion.

If there is another delivery location to examine (YES output of block 350), the search for delivery locations to assign to the bottom matrix row continues, and block 350 goes back to block 240 to determine the next base delivery location. Conversely, if all the delivery locations have been examined (NO output of block 350), the search for delivery locations to assign to the bottom matrix row is terminated, and block 350 goes on to a block 360.

In block 360, the delivery locations are actually assigned to the boxes of a matrix of the type shown in FIG. 2g, in which, more generally speaking, the occupiable boxes in the bottom row are not necessarily adjacent.

More specifically, the delivery locations are assigned from the first to the last delivery location in the mail batch according to the assignment order, which as stated, corresponds to the order in which the mail items of the delivery locations are actually delivered.

When assigning the delivery locations, it is important to bear in mind that the base delivery locations determined must be assigned to the boxes in the bottom matrix row, so that, if, in the light of the assignment criterion, a base delivery location is not to be assigned to a bottom-row box, it must be assigned to the first box in the column following the one to which it should be assigned.

This ensures the delivery location to matrix box assignment order is conformed with, and the base delivery location is located in the bottom matrix row and therefore only put through the first sorting cycle.

Assigning the delivery locations to the matrix boxes as described above, the bottom-row matrix boxes are obviously definitely assigned all the base delivery locations, but not necessarily only these. That is, in addition to the base delivery locations, non-base delivery locations, i.e. those not selected in block 310 as base delivery locations, may also be assigned.

Block 360 then goes on to a block 370, which performs a balancing subprocedure—described in detail later on with reference to FIG. 6—to balance the load of the matrix columns, to further maximize the load of the bottom matrix row, and to also balance the load of the other rows in the matrix.

Figure 6:
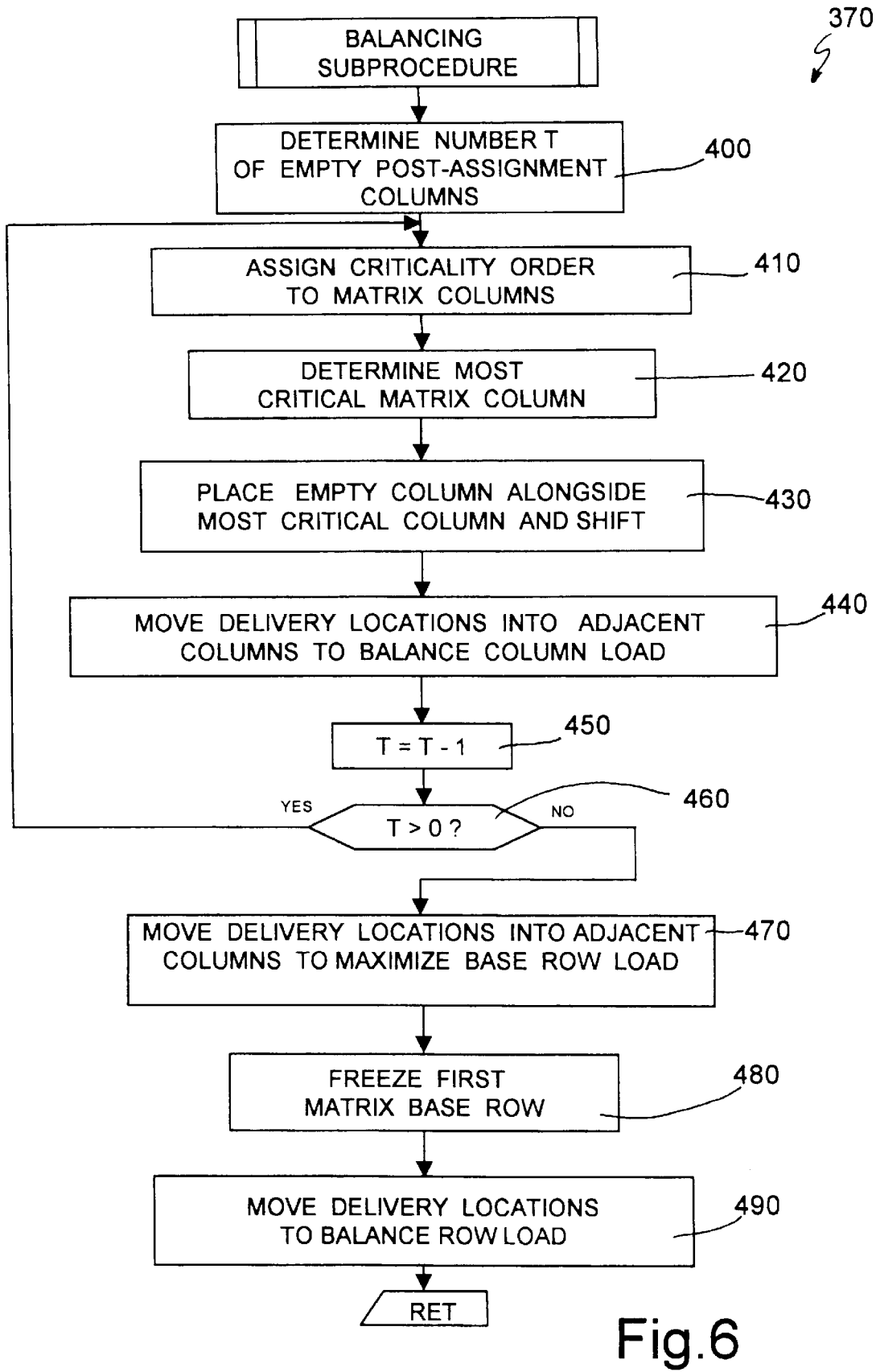
FIG. 6 shows a flow chart of a balancing subprocedure forming part of the optimization method according to the present invention, and suitable for a sorting process comprising two sorting cycles.

As shown in FIG. 6, in the balancing subprocedure, a first block 400 determines the number T of matrix columns left completely empty—i.e. whose boxes are all vacant—following assignment of the delivery locations in block 360.

Block 400 goes on to a block 410, which assigns the matrix columns a criticality order on the basis of the total load of each column, equal to the total traffic of the delivery locations assigned to it.

In other words, the most critical column will be the one with the highest mail load, i.e. the highest total traffic of the delivery locations assigned to it, and the least critical column will be the one with the lowest mail load.

Block 410 goes on to a block 420, which determines, according to the criticality order assigned to the columns, the most critical matrix column having a number of assigned delivery locations greater than one.

Block 420 goes on to a block 430, which places an empty column alongside the most critical one determined in block 420.

In other words, in block 430, the most critical machine output (to which the most critical column is related) is assigned and flanked with a further machine output for use in the sorting process.

Flanking the most critical column with an empty one is obviously followed by a one-position shift (to the right) of the columns following the most critical.

Block 430 goes on to a block 440, which, in conformance with the assignment criterion, moves particular non-base delivery locations—i.e. particular delivery locations not defined as base delivery locations—to balance the load of the columns.

More specifically, for each pair of adjacent columns, block 440 simulates moving particular non-base delivery locations between the two columns, and implements the simulated movement best improving the load balance of the two columns, thus altering the configuration of the two columns.

Obviously, if the simulated movements bring about no improvement in the initial load balance, the configuration of the two columns remains unchanged.

It should be stressed that the above movement is made in conformance with the initial assignment criterion corresponding to the order in which the mail items of the delivery locations are actually delivered, and which, as stated, allows of no change in the position of the delivery locations assigned to boxes in the same column.

In other words, the first subprocedure moves delivery locations from the assigned machine outputs to respective logically adjacent machine outputs in conformance with the order in which the delivery locations are assigned to the respective groups of outputs.

More specifically, in block 440, the matrix columns are examined successively in pairs, from the first two to the last two columns, in ascending numerical order; and, for each pair of adjacent columns, the following two movements are simulated separately:

the number in the topmost occupied box in the first column in the pair (i.e. the column to the left) is moved into the bottommost box in the second column in the pair (i.e. the column to the right), and the numbers in the second-column boxes prior to the simulated movement are shifted up one position;

the number in the bottommost occupied box in the second column is moved into the free box, in the first column, located directly over the topmost occupied box in the first column, and the numbers in the other second-column boxes prior to the simulated movement are shifted down one position.

Obviously, the above movements are simulated when the boxes in the destination column to which the number is moved are not fully occupied, and, for the reasons stated above, only if the delivery location in the first box in the second column is not a base delivery location.

If the simulated movements bring about no improvement in the load balance of the columns examined, then neither is implemented, and the configuration of the two columns remains unchanged. Conversely, if either or both the simulated movements bring about an improvement in the load balance of the columns examined, then the one achieving the best load balance of the columns examined is implemented.

More specifically, balance is assessed by determining the maximum of the two column loads prior to simulation and in both simulations, and then determining the lesser of the two. If the lesser load is equal to one of the maximum loads determined in the two simulations, then simulation has brought about an improvement in the load balance of the columns, and the simulation resulting in the lower load is implemented; conversely, if the lower load is equal to the maximum load prior to the two simulations, then neither has brought about an improvement in the load balance of the columns, and therefore neither simulation is implemented.

A more detailed account of the way in which the matrix column load is balanced can be found in Italian Patent Application TO98A000233 filed on Mar. 17, 1998 by the present Applicant.

Block 440 goes on to a block 450 where the number T of columns left empty following assignment of the delivery locations is reduced one unit, i.e. T=T−1.

Block 450 goes on to a block 460, which determines whether the number T of columns left empty following assignment of the delivery locations is greater than zero.

If T>0 (YES output of block 460), block 460 goes back to block 410 to repeat the block 410–460 operations; if T≦0 (NO output of block 460), block 460 goes on to a block 470.

While conforming with the assignment criterion, block 470 moves particular non-base delivery locations in the same way as described with reference to block 440, but this time to maximize the load of the bottom row in the matrix, and on condition that at least NR free boxes are left in the bottom row (i.e. no movement should result in delivery locations being assigned to the NR boxes corresponding to the machine outputs reserved, in the first sorting cycle, for mail items of delivery locations to be recirculated).

More specifically, as described with reference to block 440, block 470 examines successive pairs of matrix columns, from the first two to the last two in ascending numerical order, and, for each pair of adjacent columns, simulates separately the two movements described with reference to block 440.

If the simulated movements fail to maximize the load of the bottom row in the matrix, then neither simulated movement is implemented and the configuration of the two columns remains unchanged. Conversely, if either or both the simulated movements result in an increase in bottom-row load with respect to the previous load, and the load of the column into which the delivery location is moved does not exceed a predetermined maximum limit, then the simulated movement maximizing the load of the bottom row in the matrix is implemented and the configuration of the two columns altered accordingly.

Block 470 goes on to a block 480, where the bottom row in the matrix is "frozen", i.e. excluded from any further balancing operations to prevent its content being altered.

Block 480 goes on to a block 490, which, while conforming with the assignment criterion, moves delivery locations assigned to the other matrix rows to balance the load of these rows.

More specifically, in block 490, the four subprocedures described below are performed in succession.

For each matrix column, the first subprocedure simulates redistributing the delivery locations in the column into all the boxes in the column, and actually implements the simulation resulting in the best improvement in the balance of the rows, thus altering the configuration of the column. Obviously, if no simulated movement brings about an improvement in load balance, the configuration of the column remains unchanged.

In other words, the first subprocedure redistributes the numbers in the occupied boxes in each column into all the boxes in the column, so as to appropriately alternate the vacant and occupied boxes in the columns.

The above redistribution is nevertheless effected in conformance with the order in which the delivery locations are assigned to the matrix boxes.

The first subprocedure obviously only applies if the relative column contains at least one vacant box.

For each matrix row, the second subprocedure simulates moving each of the numbers in the row into adjacent free boxes in the same column, and only implements the movement resulting in improvement in the balance of the rows.

In other words, the second subprocedure simulates moving each of the numbers in the occupied boxes of each row into adjacent boxes in the same column, while at the same time conforming with the order in which the switched delivery locations are assigned to the matrix boxes.

The second subprocedure obviously only applies if at least one of the occupied boxes has at least one adjacent free box in the same column.

The third subprocedure simulates switching, between adjacent rows, pairs of delivery locations in different columns, and only implements the switches bringing about an improvement in the load balance of the two columns.

In other words, for each of the numbers in a row RC examined, the third subprocedure simulates moving, in a first column, a number in an occupied box in row RC into a free box in an adjacent row RT, and simultaneously moving, in a second column, a number in an occupied box in row RT into a free box in row RC. Each switch is made in conformance with the order in which the switched delivery locations are assigned to the matrix boxes. Obviously, the third subprocedure only applies if each of the columns contains at least one free box.

For each of the matrix rows, the fourth subprocedure simulates dividing (bisecting) each of the delivery locations in the rows into two virtually distinct delivery locations, and assigning them separately to nearby vacant boxes in the same column, and only implements the division bringing about an improvement in the load balance of the two rows.

In other words, in the fourth subprocedure, if a delivery location is bisected, it is removed from the matrix and replaced with two new delivery locations: the first delivery location resulting from the bisection is assigned to the same box as the original bisected delivery location; and the second delivery location resulting from the bisection is assigned to a box in the same column as the original bisected delivery location, but in a nearby row, depending on the available free boxes in the matrix.

Moreover, the traffic of the first and second delivery locations resulting from the bisection is reduced, typically halved, with respect to the traffic of the original bisected delivery location, so that the sum of the two equals the traffic of the original bisected delivery location.

Each two virtually distinct delivery locations are assigned to two boxes in the same column in conformance with the order in which the delivery location from which the two virtually distinct delivery locations are derived is assigned to the matrix boxes.

Obviously, the fourth subprocedure only applies when at least one of the boxes close to the one examined and located in the same column is free.

With reference to FIGS. 7a–7g, the basic principle of the present invention will now be described as applied to a three-cycle sorting process.

Figure 7A:
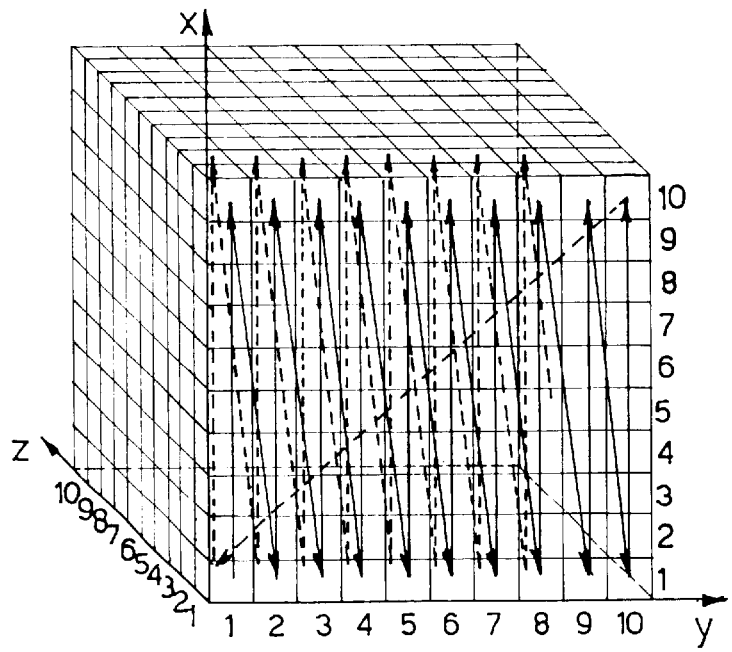
FIGS. 7a–7g show matrix representations of a sorting process comprising three sorting cycles and optimized in accordance with the present invention.

FIG. 7a shows a three-dimensional matrix representing the machine outputs at the end of the first, second, and third cycle in the sorting process, and in which:

the mail items that will be sorted into the j-th output in the first sorting cycle correspond to delivery locations assigned to the boxes in the two-dimensional matrix in plane (x=j, y, z), where j=1, . . . , NU;

the mail items that will be sorted into the j-th output in the second sorting cycle correspond to delivery locations assigned to the boxes in the two-dimensional matrix in plane (x, y=j, z), where j=1, . . . , NU;

the mail items that will be sorted into the j-th output in the third sorting cycle correspond to delivery locations assigned to the boxes in the two-dimensional matrix in plane (x, y, z=j), where j=1, . . . , NU.

In other words, by assigning the x axis to the first sorting cycle, the y axis to the second sorting cycle, and the z axis to the third sorting cycle, the mail items that will be sorted into the i-th output in the j-th sorting cycle may generally be said to correspond to delivery locations assigned to the boxes in the matrix lying in the plane which cuts the axis of the j-th sorting cycle perpendicularly at value i.

FIG. 7a also shows the order in which the delivery locations are assigned to the matrix boxes.

FIGS. 7b–7g show the changes made to the FIG. 7a matrix when applying the optimization method according to the present invention, so that the mail items of a given delivery location are only subjected to two sorting cycles. More specifically, the FIGS. 7b–7g matrixes relate to delivery locations whose mail items are only put through the first and third sorting cycle.

The FIGS. 7b–7g matrixes are similar to those described with reference to FIGS. 2b–2g and relative to a two-cycle sorting process, the only difference being that they are three- as opposed to two-dimensional.

For this reason, the FIGS. 7b–7g matrixes will only be described briefly, by representing no more than a straightforward, logical extension of the two-dimensional case.

Figure 7B:
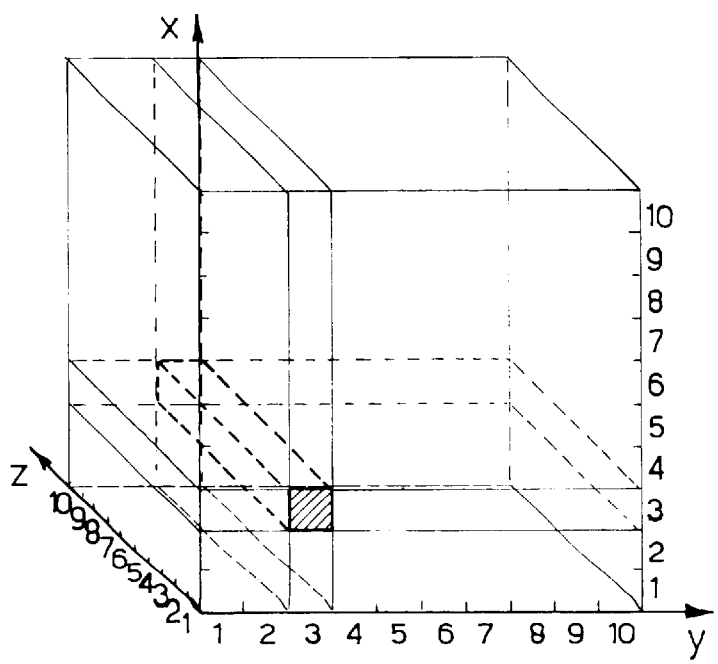

In particular, the delivery locations singled out for only two sorting cycles (the first and third) will obviously also occupy an output i at the end of the second sorting cycle, and can therefore be represented by the vector of coordinates (x=y=i, z) shown in FIG. 7b.

Figure 7C:
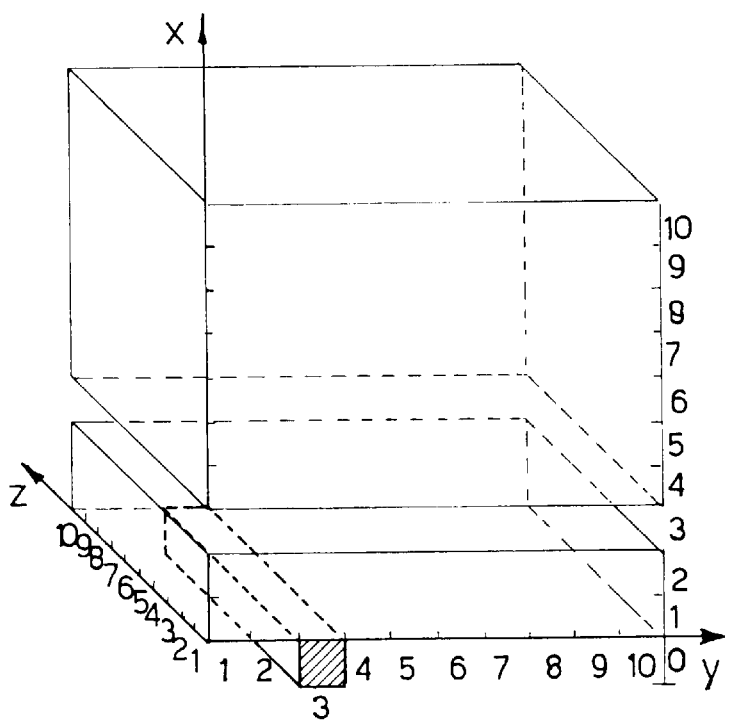

The three-dimensional matrix in FIG. 7a is therefore modified to given the three-dimensional irregular matrix in FIG. 7c, which has no plane yz containing the determined vector, so as to prevent any other delivery locations from being assigned to the boxes in that plane; and the FIG. 7b vector, as opposed to being located diagonally, is located, still in the same column, in a base plane yz.

Figure 7D:
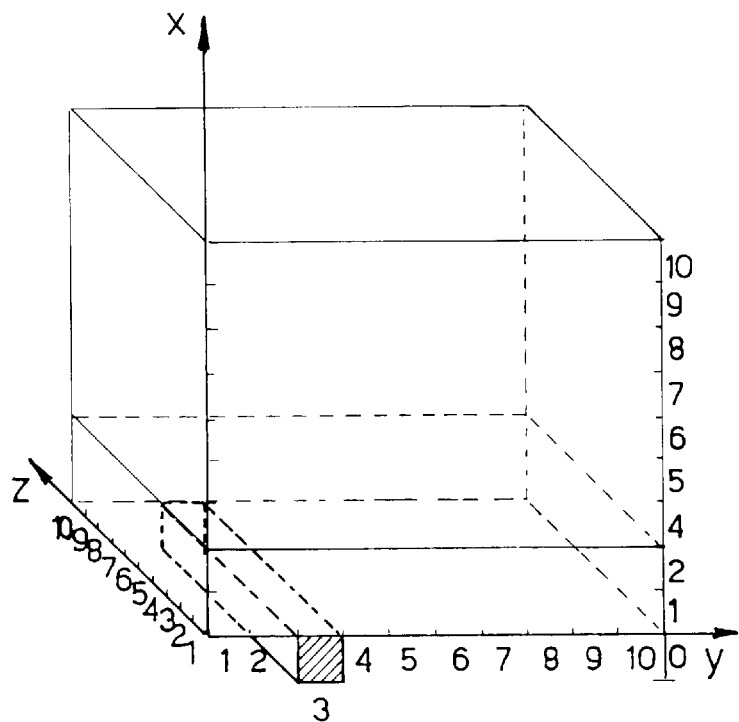

Altering the FIG. 7c matrix graphically to eliminate the empty plane (i.e. "compacting" the three-dimensional matrix) gives the FIG. 7d matrix, in which the pre-existing relation between the matrix planes and machine outputs in the various sorting cycles still applies, and the properties of the standard FIG. 7a matrix remain unchanged.

Figure 7E:
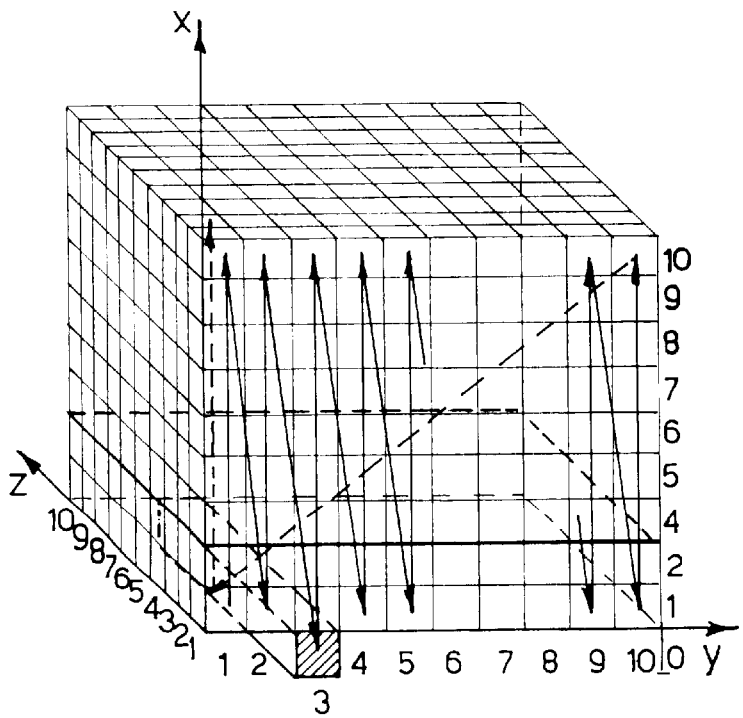

FIG. 7e shows the FIG. 7d irregular matrix illustrating the order in which the delivery locations are assigned to the matrix boxes.

Figure 7F:
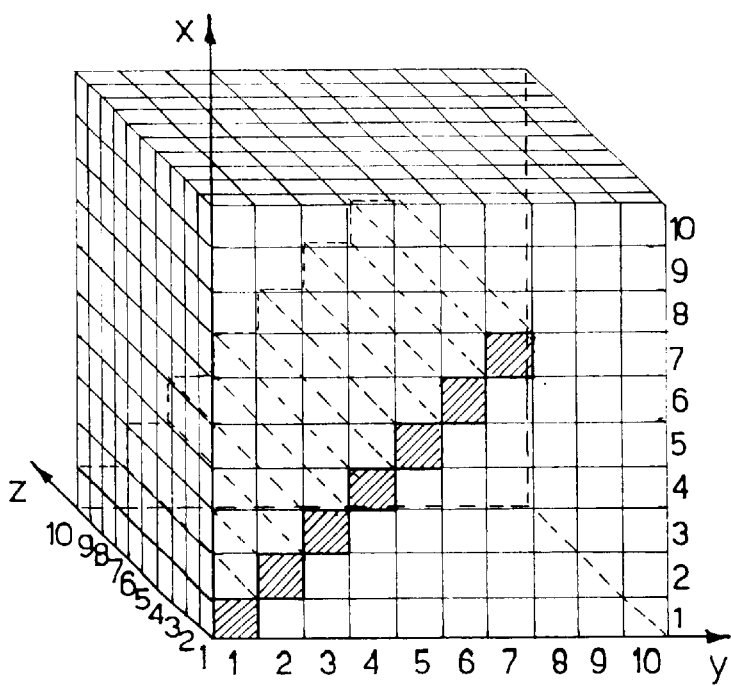
Figure 7G:
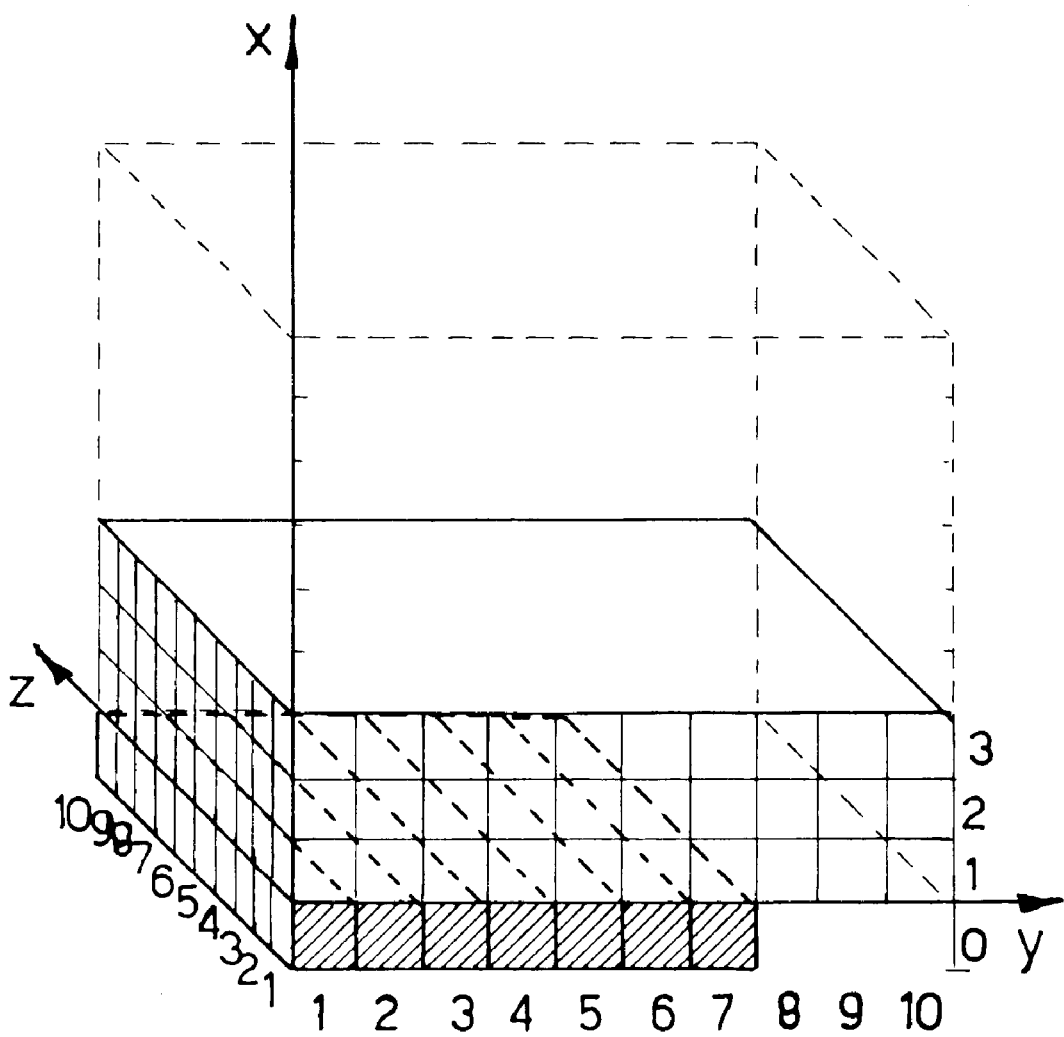

FIGS. 7f and 7g show the changes made to the standard FIG. 7a matrix to handle a number of delivery locations as described above.

More specifically, in FIG. 7f, the hatched boxes are the diagonally located ones relative to delivery locations for two-cycle sorting; and FIG. 7g shows the irregular matrix obtained by altering the FIG. 7f matrix as described above.

More specifically, the FIG. 7g matrix has an incomplete base plane yz having a number of vectors equal to the number of delivery locations for two-cycle sorting; and a number of complete planes yz equal to the number of machine outputs into which the mail items removed to also undergo the second cycle are sorted.

During the sorting process, therefore, once constructed, the FIG. 7g matrix need simply be balanced—employing a process derived, as explained later on, from the one described previously—to obtain sorting rules from the matrix.

Matrixes identical to those in FIGS. 7b–7g may be constructed for a delivery location to undergo only the first and second sorting cycle, in which case, the missing plane in FIG. 7c is a plane xz as opposed to yz.

Generally speaking, therefore, to alter the standard FIG. 7a matrix to subject the mail items of a given delivery location to only two of the three sorting cycles, the following rules apply.

If j is the sorting cycle to be performed and (j+1) the sorting cycle not to be performed, and if the x axis indicates the first sorting cycle, the y axis the second sorting cycle, and the z axis the third sorting cycle, then the FIG. 7b vector may generally be said to be determined by first determining the plane cutting the axis of the j-th sorting cycle at output value i, and then compressing the plane so determined into a vector with respect to the axis of the (j+1)-th sorting cycle.

The vector will therefore be defined as follows: in the j-th sorting cycle plane, it assumes a value of zero (by having to be located beneath all the other mail items sorted into the i-th output); in the (j+1)-th sorting cycle plane, it assumes a value i; and, in the (j−1)-th or (j+2)-th sorting cycle plane, it assumes the same values as in the standard matrix.

As regards the sorting identifiers described previously, in a three-cycle sorting process, the only possible ones are the following four: $\{1, 2, 3\}, \{1, 2\}, \{1, 3\}, \{1\}$, in that the mail items must be put through the first sorting cycle.

As can be seen, in a three-cycle sorting process, the sorting identifiers are still different from one another, but, unlike a two-cycle sorting process—in which, the number of sorting cycles indicated by the sorting identifiers are also different from one another—the number of sorting cycles indicated by the sorting identifiers may even be the same, and the number of sorting cycles indicated by two sorting identifiers assigned to two delivery location groups may even be both less than the number of cycles in the sorting process.

The number of delivery locations to be put through only two out of three sorting cycles is determined by the second optimization procedure described with reference to block 170 in FIG. 4, i.e. bearing in mind that assigning a delivery location to the base plane of the FIG. 7g matrix results in a loss of both addressability and total machine sorting capacity.

The second optimization procedure implements operations similar to those described with reference to FIGS. 5a and 5b, and therefore requiring no further explanation, the only difference being that all the two-dimensional considerations and equations—e.g. for calculating upstream, downstream and intermediate addressability losses—are simply adapted to the three-dimensional case on the basis of purely geometric considerations similar to those adopted in the two-dimensional case.

The delivery locations are assigned to the three-dimensional matrix boxes and the machine output load in each sorting cycle balanced as described below with reference to the FIG. 8 block diagram.

Figure 8:
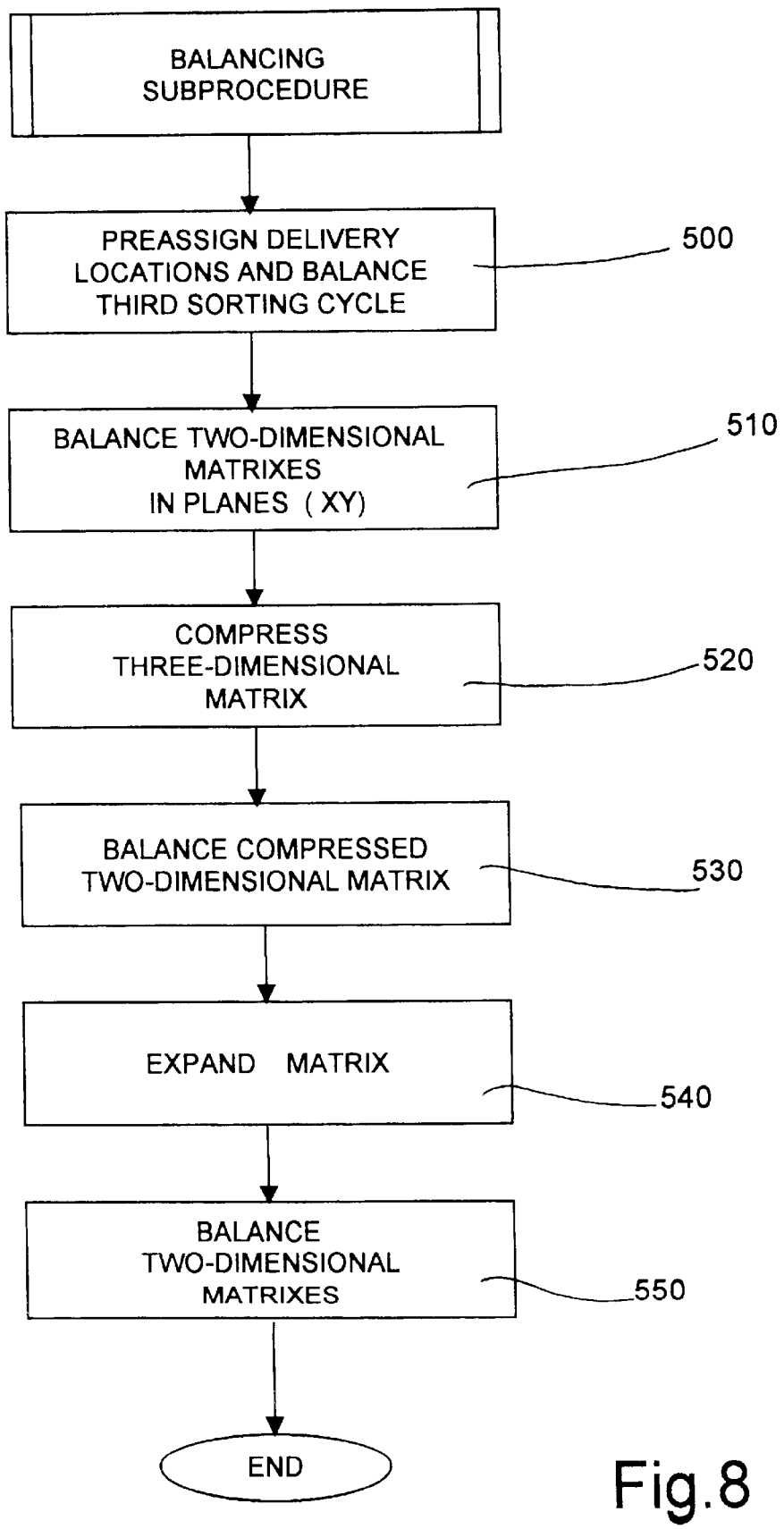
FIG. 8 shows a flow chart of a balancing subprocedure forming part of the optimization method according to the present invention, and suitable for a sorting process comprising three sorting cycles.

As shown in FIG. 8, a first block 500 preassigns the delivery locations to the matrix boxes and then balances the machine output load at the end of the third sorting cycle. This provides for determining, as stated previously regarding the three-dimensional matrix, the delivery locations to be assigned to each plane (x, y, z=i), where i=1 . . . NU.

Block 500 goes on to a block 510, which subjects each two-dimensional matrix in plane xy to a "two-dimensional" balancing process of the type described with reference to FIGS. 5a, 5b and 6, and wherein the columns are those perpendicular to the y axis, and the rows those perpendicular to the x axis.

Block 510 goes on to a block 520, in which the FIG. 7g three-dimensional matrix is compressed in a plane yz into a two-dimensional matrix, in which each box shows a mail load equal to the sum of all the mail loads in the compressed boxes in the same column parallel to the x axis.

In other words, each column along the x axis in the FIG. 7g two-dimensional matrix is compacted into one box in plane yz, which box indicates a mail load equal to the sum of the mail loads of the compacted boxes.

Block 520 goes on to a block 530, which subjects the resulting two-dimensional matrix to a "two-dimensional" balancing process of the type described with reference to FIG. 6, and wherein the columns are those perpendicular to the z axis, and the rows those perpendicular to the y axis, i.e. the y axis sorting cycle being considered as preceding that of the z axis.

Block 530 goes on to a block 540, which expands the compressed two-dimensional matrix back into a three-dimensional matrix.

The second and third sorting cycles are by now balanced, and it therefore only remains to balance the first sorting cycle.

Block 540 goes on to a block 550, which constructs a new matrix in which each row x=i comprises all the delivery locations having the same x coordinate, and each column comprises delivery locations having the same y and z coordinates.

The new matrix is then subjected to a "two-dimensional" balancing process of the type described with reference to FIG. 6, as though it related to the first sorting cycle, i.e. the x axis sorting cycle being considered as preceding that of the other axis, which relates to the succeeding sorting cycles.

FIGS. 9a–9e show the changes made to a standard matrix of the type shown in FIG. 7a, when the optimization method according to the present invention is applied to subject the mail items of a delivery location to only one of the three sorting cycles, necessarily the first.

Figure 9A:
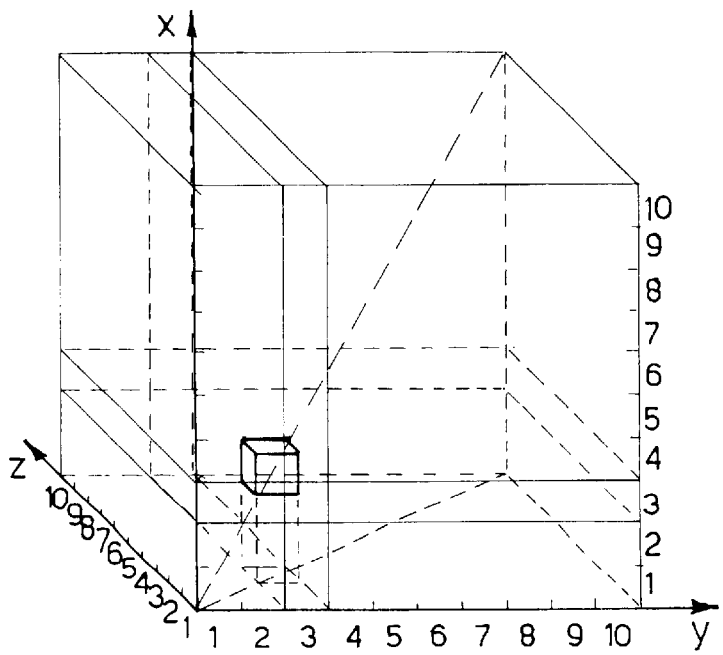
FIGS. 9a–9e show matrix representations of a sorting process comprising three sorting cycles and optimized in accordance with the present invention.

To do this, the whole plane (x=i, y, z) must only contain the box assigned to the delivery location in question, and which (as shown in FIG. 9a) is therefore located at x=y=z=i. The three-dimensional matrix is therefore modified by eliminating the plane yz containing the box, so as to prevent any further delivery locations from being assigned to the boxes in that plane, and the box in question is located, still in the same column, in a base plane yz, i.e. a plane defined by (x=0, y, z).

Figure 9B:
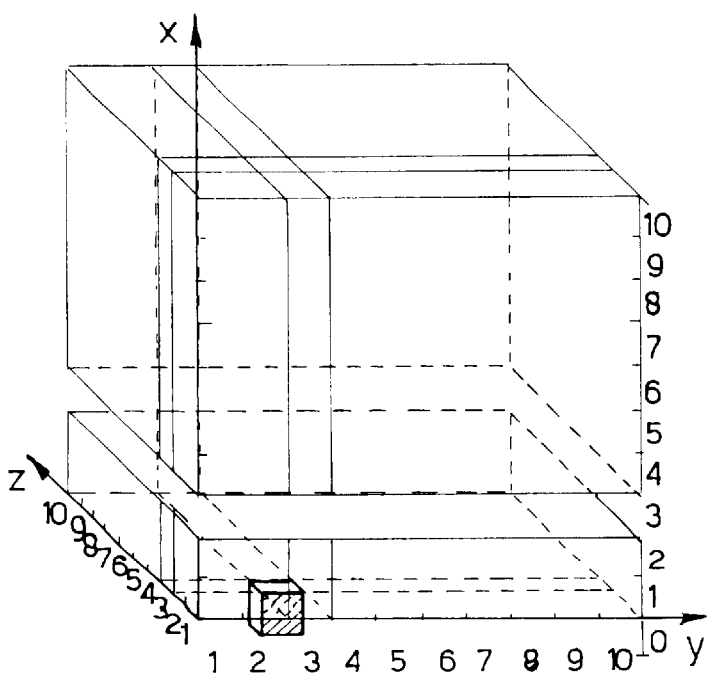
Figure 9C:
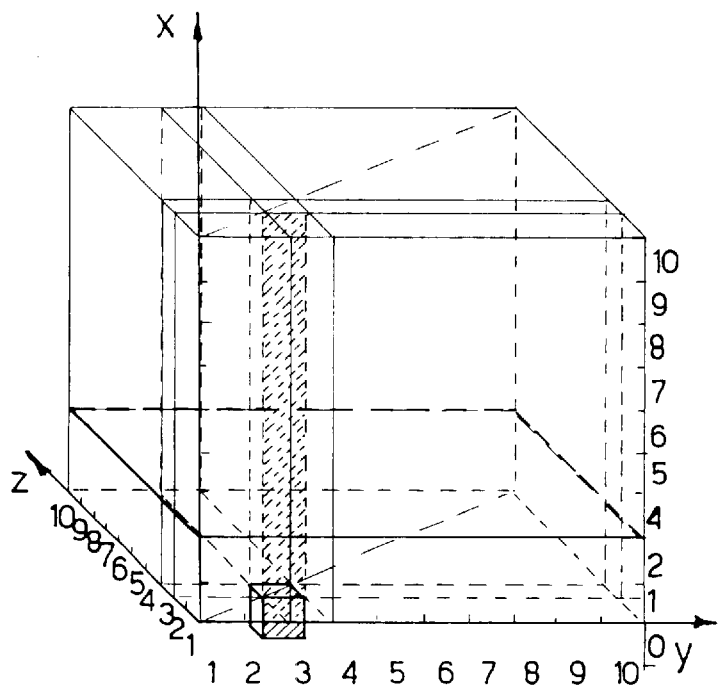

At this point, the FIG. 9b matrix is compacted to eliminate the empty plane and obtain the three-dimensional matrix in FIG. 9c.

Figure 9D:
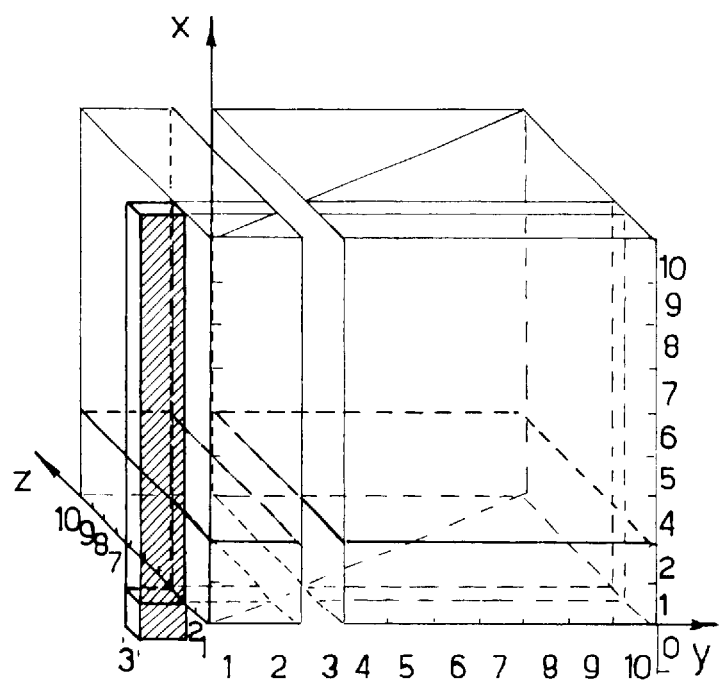

In addition to what has already been stated, the FIG. 9c matrix may be further modified as shown in FIG. 9d. That is, bearing in mind that, in the first sorting cycle, the mail items of the delivery location assigned to the box shown in FIG. 9b will be sorted into a given machine output and will not be removed until the end of the third sorting cycle, nothing prevents these mail items from being superimposed, in the second sorting cycle, with others that will also not be removed until the end of the third sorting cycle.

Such a situation can be represented in matrix form by saying that, of the entire plane y=i, only the intersection with plane z=i may be occupied, and FIG. 9d shows the alteration which may accordingly be made to the FIG. 9c matrix. More specifically, the above condition amounts to emptying plane y=i, extracting the vector (x, y=z=i) formed by the intersection of plane y=i with plane z=i, and moving the vector, together with the box in base plane (x=O, y, z), into position y=0.

Figure 9E:
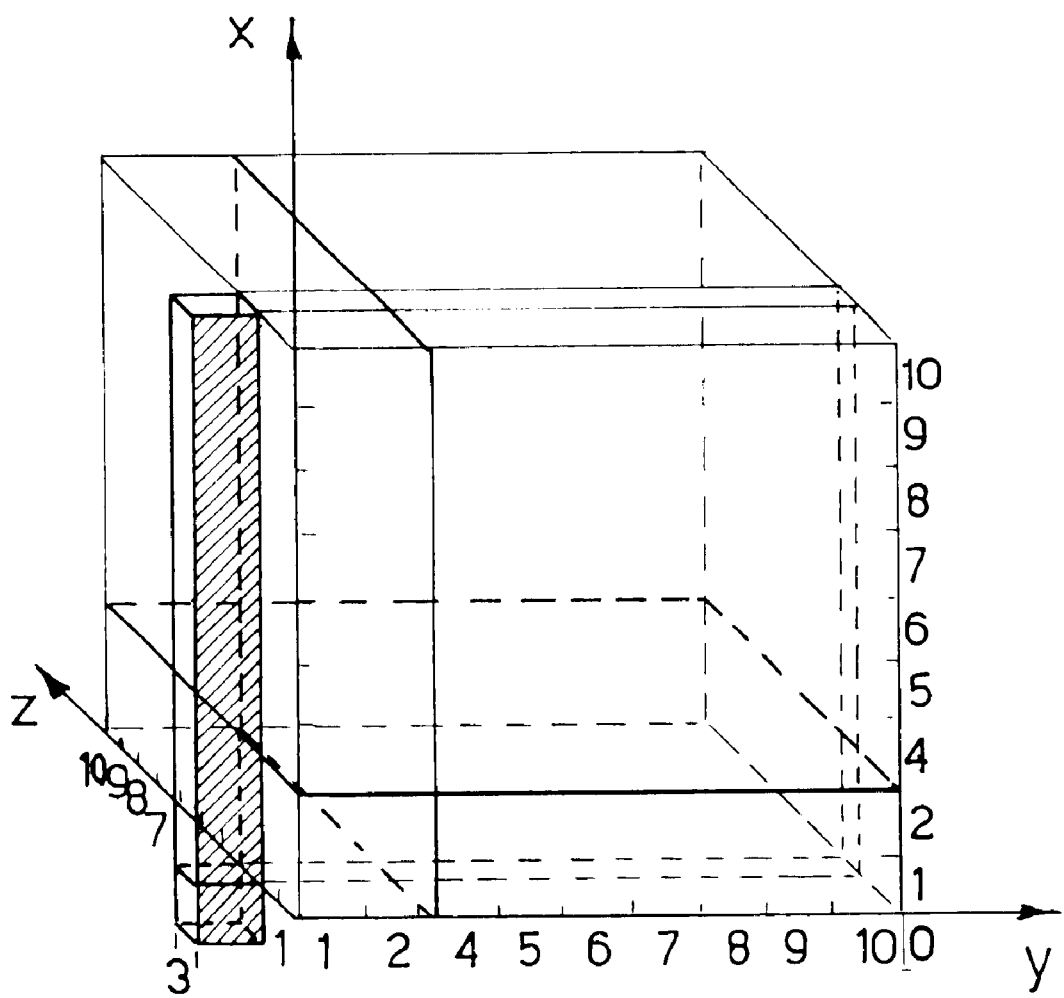

The FIG. 9d matrix may then be compacted to eliminate the missing plane and obtain the matrix shown in FIG. 9e.

The same may then be repeated for all the delivery locations whose mail items are to be put through only one sorting cycle.

Clearly, changes may be made to the optimization method as described and illustrated herein without, however, departing from the scope of the present invention.

For example, in the first optimization procedure described with reference to FIGS. 5a and 5b, the base delivery locations may be determined otherwise than as described, and in particular by considering only one of optimization addressability and sorting capacity margins M2 and M3.

What is claimed is:

1. A method of optimizing a mail sorting process, said sorting process including the performance of a first and at least a second sorting cycle, and being performed on a sorting machine (1), which receives a group of mail items (2) at an input (I) and supplies, at its outputs (U), said mail items (2) identified and separated according to given sorting rules; in a given sorting cycle, the mail items (2) being fed to the outputs (U) of the sorting machine (1) according to a predetermined respective sorting criterion, and then being fed into orderly manner back into the input (I) of the sorting machine (1) for a following sorting cycle; each output of said sorting machine (1) being assigned at least one respective delivery location according to an assignment criterion related to the delivery order of the mail items in the delivery location and said optimization method comprising the steps of:

assigning to a first group of delivery locations a first sorting identifier indicating to which sorting cycles the mail items in said first group of delivery locations are to be subjected, and to at least a second group of delivery locations at least a second sorting identifier indicating to which sorting cycles the mail items in said second group of delivery location are to be subjected, said first and second sorting identifiers being different from each other; and subjecting each of the said mail items to the sorting cycles indicated by the respective sorting identifiers, wherein, both the number of sorting cycles indicated by said first sorting identifier and the number of sorting cycles indicated by said second sorting identifier are less than the number of sorting cycles in said sorting process.

2. An optimization method as claimed in claim 1, wherein in a given current sorting cycle, the outputs of said sorting machine (1) are divided into a first group of outputs containing mail items to be subjected to the following sorting cycle, and a second group of outputs containing mail items which are not to be subjected to said following sorting cycle; and in that, in said following sorting cycle, the mail items contained in said first group of outputs are also sorted into outputs in said second group.

3. An optimization method as claimed in claim 1, wherein at the end of said current sorting cycle, at least some of the mail items contained in the outputs in said second group are not removed from the respective outputs.

4. An optimization method as claimed in claim 1, further comprising the step of: performing a balancing procedure to balance the mail load of the outputs (U) of said sorting machine (1) in each said cycle.

5. A method of optimizing a mail sorting process, said sorting process including the performance of a first and at least a second sorting cycle, and being performed on a sorting machine (1), which receives a group of mail items (2) at an input (I) and supplies, at its outputs (U), said mail items (2) identified and separated according to given sorting rules; in a given sorting cycle, the mail items (2) being fed to the outputs (U) of the sorting machine (1) according to a predetermined respective sorting criterion, and then being fed into orderly manner back into the input (I) of the sorting machine (1) for a following sorting cycle; each output of said sorting machine (1) being assigned at least one respective delivery location according to an assignment criterion related to the delivery order of the mail items in the delivery location and said optimization method comprising the steps of:

assigning to a first group of delivery locations a first sorting identifier indicating to which sorting cycles the mail items in said first group of delivery locations are to be subjected, and to at least a second group of delivery locations at least a second sorting identifier indicating to which sorting cycles the mail items in said second group of delivery location are to be subjected said first and second sorting identifiers being different from each other;

determining, from said groups of delivery locations, a lower-recirculation group of delivery locations, the number of sorting cycles indicated by the sorting identifier relative to said lower-recirculation group of delivery locations being lower than the number of sorting cycles in said sorting process;

forming said lower-recirculation group of delivery locations using a formation criterion based on maximizing the mail traffic subjected to the sorting cycles indicated by the respective sorting identifiers; and subjecting each of the said mail items to the sorting cycles indicated by the respective sorting identifiers.

6. An optimization method as claimed in claim 5, wherein said step of forming said lower-recirculation group of delivery locations comprises the steps of:

determining a delivery location using a first predetermined determination criterion;

determining an addressability loss (YT) indicating the mail addressability loss which would result from assigning said delivery location to said lower-recirculation group of delivery locations; and determining whether to insert said delivery location into said lower-recirculation group of delivery locations as a function of said addressability loss (YT).

7. An optimization method as claimed in claim 6, wherein said step of determining whether to insert said delivery location into said lower-recirculation group of delivery locations as a function of said addressability loss comprises the steps of:

determining a current addressability margin (M2) 5 indicating an addressability loss still available for forming said lower-recirculation group of delivery locations as a function of said addressability loss (YT) and of a preceding addressability margin (M2) determined for the preceding delivery location assigned to said lower-recirculation group of delivery locations;

comparing said current addressability margin (M2) with a reference addressability margin; and inserting said delivery location into said lower-recirculation group of delivery locations if said current addressability margin (M2) has a first predetermined relation with said reference addressability margin.

8. An optimization method as claimed in claim 7, wherein said step of determining a current addressability margin (M2) comprises the step of subtracting said addressability loss (YT) from said preceding addressability margin (M2).

9. An optimization method as claimed in claim 7, wherein said first predetermined relation is defined by the condition that said current addressability margin (M2) be greater than or equal to said reference addressability margin.

10. An optimization method as claimed in claim 6, wherein said first determination criterion is a maximum mail traffic criterion.

11. An optimization method as claimed in claim 5, wherein said step of forming said lower-recirculation group of delivery locations also comprises the steps of:

determining a delivery location using a second predetermined determination criterion;

determining a sorting capacity loss (PC) indicating the mail sorting capacity loss which would result from assigning said delivery location to said lower-recirculation group of delivery locations; and determining whether to insert said delivery location into said lower-recirculation group of delivery locations as a function of said sorting capacity loss (PC).

12. An optimization method as claimed in claim 11, wherein said step of determining whether to insert said delivery location into said lower-recirculation group of delivery locations as a function of said sorting capacity loss (PC) comprises the steps of:

determining a current sorting capacity margin (M3) indicating a sorting capacity loss still available for forming said lower-recirculation group of delivery locations as a function of said sorting capacity loss (PC) and of a preceding sorting capacity margin (M3) determined for the preceding delivery location assigned to said lower-recirculation group of delivery locations;

comparing said current sorting capacity margin (M3) with a reference sorting capacity margin; and inserting said delivery location into said lower-recirculation group of delivery locations if said current sorting capacity margin (M3) has a second predetermined relation with said reference sorting capacity margin.

13. An optimization method as claimed in claim 12, wherein said step of determining a current sorting capacity margin (M3) comprises the step of subtracting said sorting capacity loss (PC) from said preceding sorting capacity margin (M3).

14. An optimization method as claimed in claim 12, wherein said second predetermined relation is defined by the condition that said current sorting capacity margin (M3) be greater than or equal to said reference sorting capacity margin.

15. An optimization method as claimed in claim 11, wherein said second determination criterion is a maximum mail traffic criterion.

16. An optimization method as claimed in claim 5, wherein said step of forming said lower-recirculation group of delivery locations comprises the steps of:

determining a delivery location on the basis of a 25 third predetermined determination criterion;

determining an addressability loss (YT) indicating the mail addressability loss which would result from assigning said delivery location to said lower-recirculation group of delivery locations;

determining a sorting capacity loss (PC) indicating the mail sorting capacity loss which would result from assigning said delivery location to said lower-recirculation group of delivery locations; and determining whether to insert said delivery location into said lower-recirculation group of delivery locations as a function of said addressability loss (YT) and of said sorting capacity loss (PC).

17. An optimization method as claimed in claim 16, wherein said step of determining whether to insert said delivery location into said lower-recirculation group of delivery locations as a function of said addressability loss (YT) and of said sorting capacity loss (PC) comprises the steps of:

determining a current addressability margin (M2) indicating an addressability loss still available for forming said lower-recirculation group of delivery locations as a function of said addressability loss (YT) and of a preceding addressability margin (M2) determined for the preceding delivery location assigned to said lower-recirculation group of delivery locations;

determining a current sorting capacity margin (M3) indicating a sorting capacity loss still available for forming said lower-recirculation group of delivery locations as a function of said sorting capacity loss (PC) and of a preceding sorting capacity margin (M3) determined for the preceding delivery location assigned to said lower-recirculation group of delivery locations;

comparing said current addressability margin (M2) with a reference addressability margin, and said current sorting capacity margin (M3) with a reference sorting capacity margin; and inserting said delivery location into said lower-recirculation group of delivery locations if said current addressability margin (M2) has a third predetermined relation with said reference addressability margin, and said current sorting capacity margin (M3) has a fourth predetermined relation with said reference sorting capacity margin.

18. An optimization method as claimed in claim 17, wherein said step of determining a current addressability margin (M2) comprises the step of subtracting said addressability loss (YT) from said preceding addressability margin (M2); and in that said step of determining a current sorting capacity margin (M3) comprises the step of subtracting said sorting capacity loss (PC) from said preceding sorting capacity margin (M3).

19. An optimization method as claimed in claim 17, wherein said third predetermined relation is defined by the condition that said current addressability margin (M2) be greater than or equal to said reference addressability margin; and in that said fourth predetermined relation is defined by the condition that said current sorting capacity margin (M3) be greater than or equal to said reference sorting capacity margin.

20. An optimization method as claimed in claim 16, wherein said third determination criterion is a maximum mail traffic criterion.

21. A method of optimizing a mail sorting process, said sorting process including the performance of a first and at least a second sorting cycle, and being performed on a sorting machine (1), wherein the sorting machine receives a group of mail items (2) at an input (I) and supplies a its outputs (U), said mail items (2) identified and separated according to given sorting rules; and wherein a given sorting cycle, the mail items (2) being fed to the outputs (U) of the sorting machine (1) according to a predetermined respective sorting criterion, and then being fed into orderly manner back into the input (i) of the sorting machine(1) for a following sorting cycle; and wherein each output of said sorting machine (1) being assigned at least one respective delivery location according to an assignment criterion related to the delivery order of the mail items in the delivery location and said optimization method comprises the steps of:

forming a first and at least a second groups of delivery locations;

subjecting the mail items to be delivered to the first group of delivery locations to a number of sorting cycles lower than the one to which the mail items to be delivered in the second group of delivery locations are subjected;

wherein the first group of delivery location is formed using a criterion based on the maximization of the mail traffic in the relative sorting cycles.

22. An optimization method as claimed in claim 21, wherein the step of subjecting the mail items to be delivered in the first group of delivery locations to a number of sorting cycles lower than the one to which the mail items to be delivered in the second group of delivery locations are subjected comprises the steps of:

assigning to the first group of delivery locations a first sorting identifier indicating to which sorting cycles the mail items to be delivered in the first group of delivery locations; and assigning to the second group of delivery locations a second sorting identifier indicating to which sorting cycles the mail items to be delivered in the second group of delivery locations are to be subjected;

wherein the number of sorting cycles indicated by the first sorting identifier is lower than the number of sorting cycles indicated by the second sorting identifier.

23. A method of optimizing a mail sorting process, said sorting process including the performance of a first and at least a second sorting cycle, and being performed on a sorting machine (1), wherein the sorting machine receives a group of mail items (2) at an input (I) and supplies a its outputs (U), said mail items (2) identified and separated according to given sorting rules; and wherein a given sorting cycle, the mail items (2) being fed to the outputs (U) of the sorting machine (1) according to a predetermined respective sorting criterion, and then being fed into orderly manner back into the input (i) of the sorting machine(1) for a following sorting cycle; and wherein each output of said sorting machine (1) being assigned at least one respective delivery location according to an assignment criterion related to the delivery order of the mail items in the delivery location and said optimization method comprises the steps of:

forming a first and at least a second groups of delivery locations;

subjecting the mail items to be delivered to the first group of delivery locations to a number of sorting cycles lower than the one to which the mail items to be delivered in the second group of delivery locations are subjected;

wherein the first group of delivery location is formed using a criterion based on the minimization of the sorting process elapsed time.

24. An optimization method as claimed in claim 23, wherein the step of subjecting the mail items to be delivered in the first group of delivery locations to a number of sorting cycles lower than the one to which the mail items to be delivered in the second group of delivery locations are subjected comprises the steps of:

assigning to the first group of delivery locations a first sorting identifier indicating to which sorting cycles the mail items to be delivered in the first group of delivery locations; and assigning to the second group of delivery locations a second sorting identifier indicating to which sorting cycles the mail items to be delivered in the second group of delivery locations are to be subjected;

wherein the number of sorting cycles indicated by the first sorting identifier is lower than the number of sorting cycles indicated by the second sorting identifier.

* * * * *